US010003859B2

(12) United States Patent
Sumitomo et al.

(10) Patent No.: US 10,003,859 B2
(45) Date of Patent: Jun. 19, 2018

(54) DISTRIBUTION DEVICE AND DISTRIBUTION METHOD

(71) Applicant: YAHOO JAPAN CORPORATION, Tokyo (JP)

(72) Inventors: Eiji Sumitomo, Tokyo (JP); Kanta Suzuki, Tokyo (JP); Kazutaka Kimura, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 408 days.

(21) Appl. No.: 14/324,841

(22) Filed: Jul. 7, 2014

(65) Prior Publication Data
US 2015/0082339 A1 Mar. 19, 2015

(30) Foreign Application Priority Data

Sep. 19, 2013 (JP) ................................ 2013-194612

(51) Int. Cl.
H04N 7/10 (2006.01)
H04N 7/025 (2006.01)
(Continued)

(52) U.S. Cl.
CPC ..... *H04N 21/812* (2013.01); *H04N 21/41407* (2013.01); *H04N 21/42202* (2013.01);
(Continued)

(58) Field of Classification Search
CPC ........... H04N 21/812; H04N 21/41407; H04N 21/42202; H04N 21/42222; H04N 21/4316; H04N 21/4436
See application file for complete search history.

(56) References Cited

U.S. PATENT DOCUMENTS 7,788,583 B1*  8/2010  Amzallag ......... G06F 17/30781
                                                  345/629
2011/0145863 A1*  6/2011  Alsina .................. G06F 9/4445
                                                  725/44
2013/0191776 A1*  7/2013  Harris ............... H04M 1/72561
                                                  715/784

FOREIGN PATENT DOCUMENTS

JP     H11-257973 A     9/1999
JP     2002-123801 A    4/2002
(Continued)

OTHER PUBLICATIONS

DOI, Shigeki, "Moving Image Processing and Windows Programming, Basics of Moving Image Processing Implemented with Win32API and DirectX," pp. 142-167, Apr. 1, 2003.
(Continued)

Primary Examiner — Oschta Montoya
(74) Attorney, Agent, or Firm — Oliff PLC

(57) ABSTRACT

A distribution device includes a distribution unit that distributes a content including a control program to a user terminal. The control program causes the user terminal to execute an acquisition procedure for acquiring an area of the content, the area being displayed by a browser program, as a viewable area, a determination procedure for determining whether or not a display area where a video is displayed, the display area being included in the content, is located in the viewable area, and a playback procedure for starting playback of the video if the display area is located in the viewable area and the situation of the user terminal is a predetermined situation.

17 Claims, 16 Drawing Sheets

(51) Int. Cl.
*H04N 21/81* (2011.01)
*H04N 21/414* (2011.01)
*H04N 21/422* (2011.01)
*H04N 21/431* (2011.01)
*H04N 21/443* (2011.01)

(52) U.S. Cl.
CPC ... *H04N 21/42222* (2013.01); *H04N 21/4316* (2013.01); *H04N 21/4436* (2013.01)

(56) References Cited

FOREIGN PATENT DOCUMENTS

| | | |
|---|---|---|
| JP | 2003-250117 A | 9/2003 |
| JP | 2006-011358 A | 1/2006 |
| JP | 2006-148675 A | 6/2006 |
| JP | 2007-134885 A | 5/2007 |
| JP | 2011-003001 A | 1/2011 |
| JP | 2011-018272 A | 1/2011 |
| JP | A-2011-128204 | 6/2011 |
| JP | 2012-049586 A | 3/2012 |
| JP | 2012-182552 A | 9/2012 |
| JP | 2013-032932 A | 2/2013 |
| JP | 5235240 B1 | 7/2013 |

OTHER PUBLICATIONS

Aug. 19, 2014 Office Action issued in Japanese Application No. 2013-194612.
Jan. 13, 2015 Office Action issued in Japanese Application No. 2013-194612.
Jun. 7, 2016 Office Action issued in Japanese Patent Application No. 2015-237924.
Nov. 8, 2016 Office Action issued in Japanese Patent Application No. 2015-237924.
Dec. 5, 2017 Office Action issued in Japanese Patent Application No. 2017-021705.

\* cited by examiner

| URL | CONTENT DATA |
|---|---|
| http://www.yahoo.co.jp/xxx/ | CONTENT 1 |
| http://www.yahoo.co.jp/yyy/ | CONTENT 2 |
| http://www.yahoo.co.jp/zzz/ | CONTENT 3 |
| ⋮ | ⋮ |

FIG.5
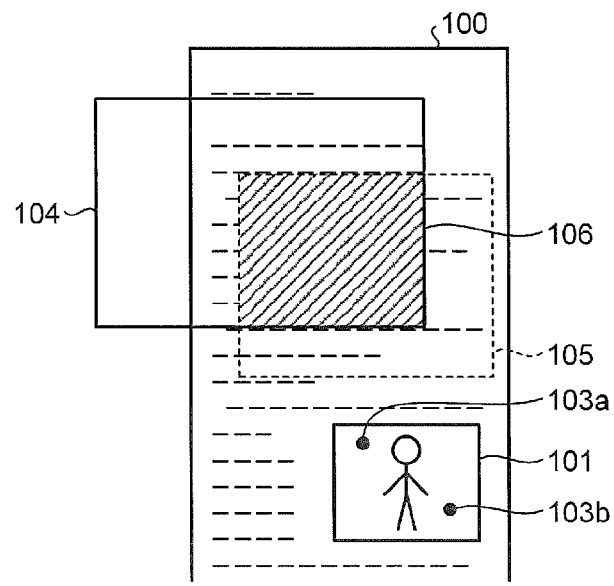
FIG.6A    FIG.6B    FIG.6C
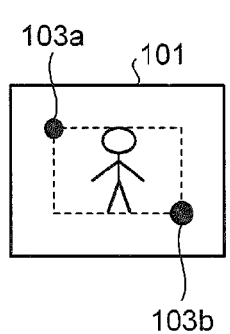 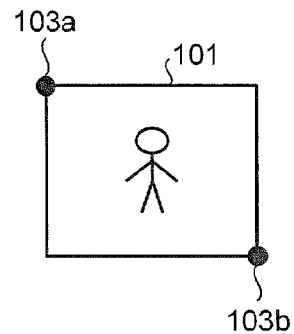 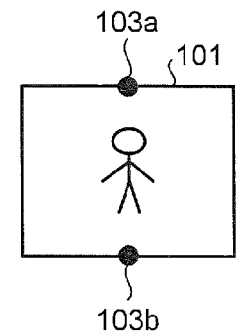

DISTRIBUTION DEVICE AND DISTRIBUTION METHOD

CROSS-REFERENCE TO RELATED APPLICATIONS

The present application claims priority to and incorporates by reference the entire contents of Japanese Patent Application No. 2013-194612 filed in Japan on Sep. 19, 2013.

BACKGROUND OF THE INVENTION

1. Field of the Invention

The present invention relates to a distribution device, a distribution method, and a distribution program.

2. Description of the Related Art

Japanese Patent Application Laid-open No. 2011-128204 discloses an advertising distribution device that displays advertisements in an advertisement display area if the display area is included in an area displayed on a screen of a web browser within a web page area.

The technology of Japanese Patent Application Laid-open No. 2011-128204 displays an advertisement in an advertisement display area regardless of the situation of a user as long as the display area is included in the area of the screen of the web browser. Hence, when the user is not in a situation to look at the advertisement, the advertisement is displayed uselessly without being looked at by the user. Moreover, in a case of video advertising, power consumption of a terminal is relatively increased for a display of the advertisement. Hence, a useless display of advertisements shortens the battery life of the terminal.

SUMMARY OF THE INVENTION

It is an object of the present invention to at least partially solve the problems in the conventional technology.

According to one aspect of an embodiment, a distribution device including a distribution unit configured to distribute a content including a control program to a user terminal, the control program causing the user terminal to execute an acquisition procedure for acquiring an area of the content, the area being displayed by a browser program, as a viewable area, a display area determining procedure for determining whether or not a display area where a video based on video data is displayed, the display area being included in the content, is located in the viewable area, and a playback procedure for starting playback of the video if the display area is located in the viewable area and the situation of the user terminal is a predetermined situation.

The present invention can prevent a useless advertising display.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a conceptual diagram illustrating an example of a viewable area;

FIGS. 6A, 6B, and 6C are conceptual diagrams illustrating examples of reference positions;

DETAILED DESCRIPTION OF THE PREFERRED EMBODIMENTS

First Embodiment

A first embodiment is described first with reference to the drawings.

Outline of Processes

Figure 1:
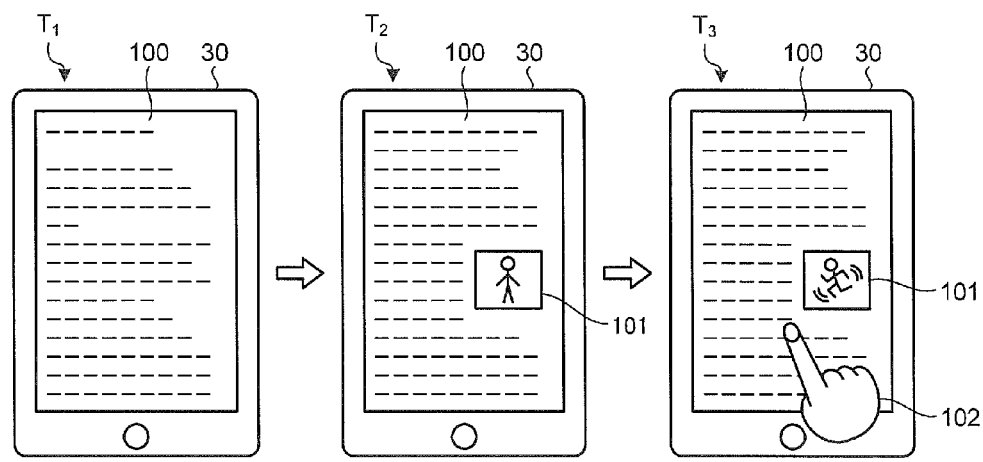
FIG. 1 is a conceptual diagram illustrating an example of an outline of processes in a first embodiment.

FIG. 1 is a conceptual diagram illustrating an example of an outline of processes in the first embodiment. A user terminal acquires content data distributed from a distribution device, and creates a content 100 based on the acquired content data. The user terminal then displays the created content 100 on a screen of the user terminal.

The content 100 in the embodiment includes a display area 101 of a video that is a display area where a video is displayed. The video is played back in the display area 101. In the embodiment, the video played back in the display area 101 of the content 100 is, for example, a video advertisement.

In the embodiment, the content data distributed from the distribution device to the user terminal includes a control program. In the embodiment, the content 100 is, for example, a Web content. The control program is, for example, JavaScript (registered trademark). The user terminal executes the control program to control playback of the video advertisement in the display area 101.

For example, at time $T_1$ of FIG. 1, the user terminal displays an area of the content 100 on the screen of the user terminal. At this stage, the display area 101 is not displayed on the screen of the user terminal. Hence, the user terminal does not play back the video advertisement.

Moreover, for example, as in at time $T_2$ of FIG. 1, when the display area 101 of the video advertisement is being displayed on the screen of the user terminal, the user terminal does not play back the video advertisement in the display area 101 unless there is an operation from a user 102.

For example, as in at time $T_3$ of FIG. 1, if the user 102 implements an operation, such as the touch of the screen of the user terminal, on the user terminal, the user terminal plays back the video advertisement in the display area 101 displayed on the screen of the user terminal.

Even if the display area 101 of the video advertisement is displayed on the screen of the user terminal, the user is not necessarily looking at the screen of the user terminal. Hence, if the video advertisement is played back in the display area 101 immediately after the display area 101 of the video advertisement is displayed on the screen of the user terminal, the video advertisement is played back uselessly in some cases.

In contrast, the distribution device of the embodiment distributes, to the user terminal, the control program to play back the video advertisement in the display area 101, if the display area 101 of the video advertisement is displayed on the screen of the user terminal and the user terminal is in a predetermined situation. In the embodiment, that the user terminal is in the predetermined situation is, for example, that the user has operated the user terminal. That the user terminal has been operated indicates a high possibility that the user is looking at the screen. Hence, the video advertisement is played back in a situation that it is highly likely that the user is looking at the screen. Accordingly, the distribution device of the embodiment can reduce useless playback of the video advertisement. Consequently, the distribution device of the embodiment can suppress an increase in the power consumption of the user terminal.

Configurations of Distribution System 10 and Distribution Device 20

Figure 2:
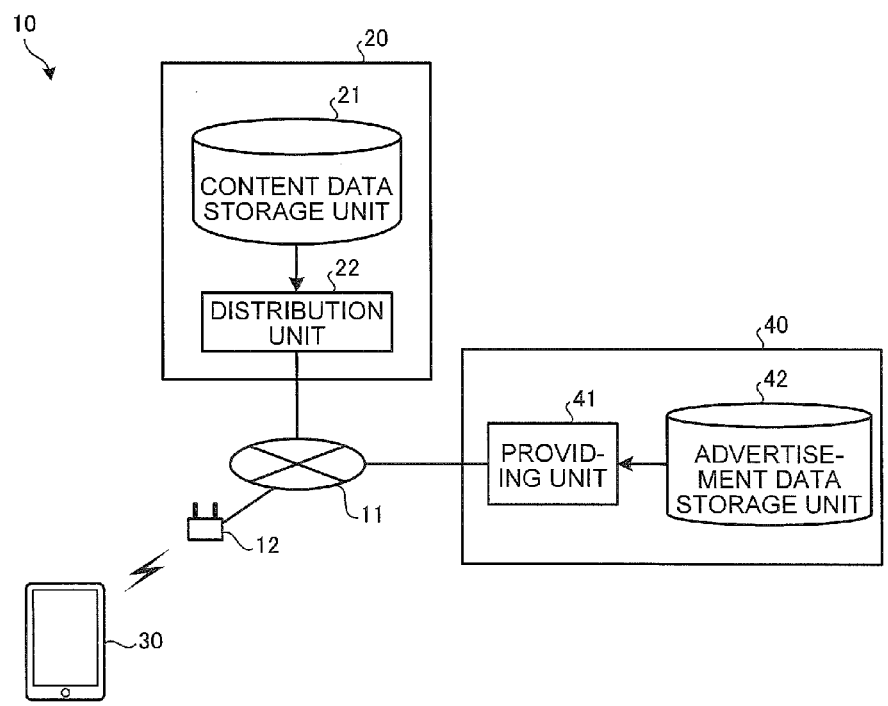
FIG. 2 is a system configuration diagram illustrating an example of a distribution system in the first embodiment.

FIG. 2 is a system configuration diagram illustrating an example of a distribution system in the first embodiment. A distribution system 10 in the embodiment includes a distribution device 20, a user terminal 30, and an advertising server 40. The distribution device 20 is connected to a communication line 11 and can transmit and receive communication data via the communication line 11.

Figures 3, 4:
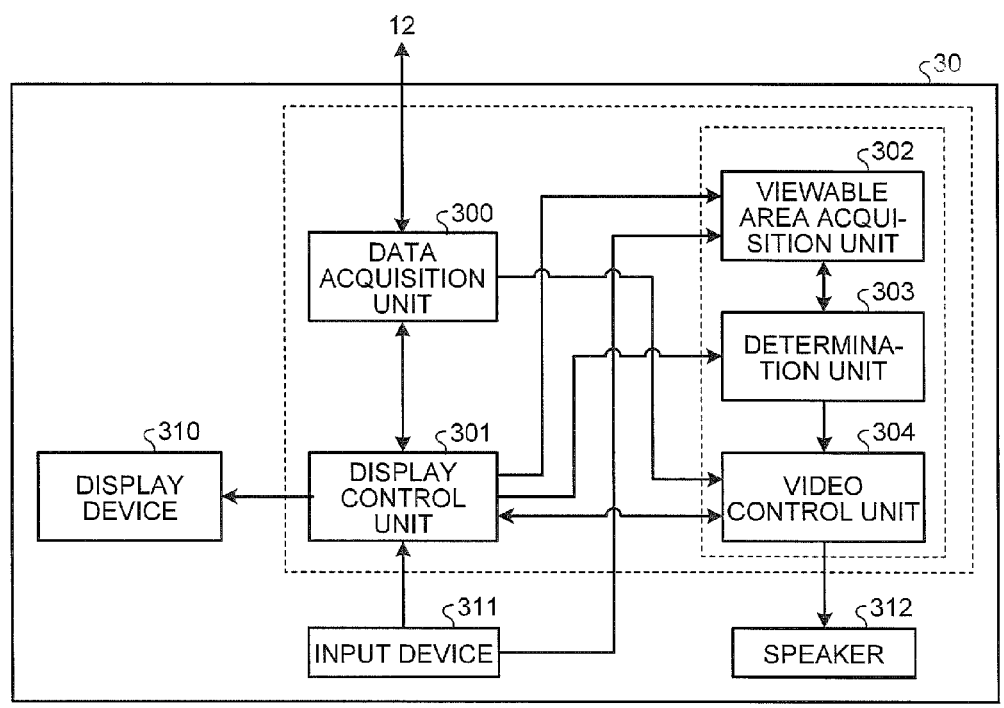
FIG. 3 is a diagram illustrating an example of the structure of data stored in a content data storage unit.
FIG. 4 is a block diagram illustrating an example of a functional configuration of a user terminal in the first embodiment.

The distribution device 20 includes a content data storage unit 21, and a distribution unit 22. FIG. 3 is a diagram illustrating an example of the structure of data stored in the content data storage unit. For example, as illustrated in FIG. 3, each piece of content data 211 is associated with a URL 210 of its access destination and stored in the content data storage unit 21. FIG. 3 illustrates the content data storage unit 21 in which the content data 211 of "content 1" is stored while being associated with the URL 210 of "http://www.yahoo.co.jp/xxx/".

If receiving an URL of content data from the user terminal 30 via the communication line 11, the distribution unit 22 extracts the content data associated with the received URL from the content data storage unit 21. The distribution unit 22 then transmits the extracted content data to the user terminal 30 via the communication line 11.

In the embodiment, the distribution device 20 includes the content data storage unit 21 that stores content data. However, as another mode, the content data may be stored in a different device from the distribution device 20. In this case, the distribution device 20 includes an acquisition unit that acquires, from the different device, content data corresponding to an URL received from the user terminal 30. The distribution unit 22 then transmits the content data acquired by the acquisition unit to the user terminal 30 via the communication line 11.

The user terminal 30 can communicate wirelessly with a base station 12 connected to the communication line 11 and transmit and receive communication data between the distribution device 20 and the advertising server 40 via the base station 12 and the communication line 11. In the embodiment, the user terminal 30 is, for example, a mobile PC (Personal Computer), a PDA (Personal Digital Assistant), or a smartphone, which is used by the user. A browser application (for example, a browser program) is installed in the user terminal 30.

In the embodiment, a standard browser program installed in the user terminal 30 interprets the control program such as JavaScript. However, various applications that can display a Web content may be installed in addition to the browser program in a smart device such as a smartphone. Among such applications, there is one that changes a UI (User Interface) in some degree according to the content in addition to one that displays the content as it is. Such an application may interpret the control program such as JavaScript to cause the user terminal 30 to realize a display in accordance with the content data.

The advertising server 40 includes a providing unit 41 and an advertisement data storage unit 42. The advertisement data and reference positions of video advertisements are stored by attribute information in the advertisement data storage unit 42. The attribute information is information indicating the attributes of the user of the user terminal 30, and contains information such as the age, gender, and nationality of the user. The reference positions are information used to determine whether or not the display area 101 in which the associated video advertisement is displayed has been displayed on the screen of the user terminal 30. The reference positions are described in detail later.

The providing unit 41 receives an advertising request including the attribute information and an area ID of the display area 101 in which the video advertisement is played back from the user terminal 30 via the communication line 11. The providing unit 41 then refers to the advertisement data storage unit 42 and selects one piece of advertisement data and one reference position of a video advertisement associated with the attribute information included in the received advertising request. The providing unit 41 then transmits the selected advertisement data and reference position, together with the area ID included in the advertising request, to the user terminal 30 via the communication line 11.

The user terminal 30 receives content data including the control program from the distribution device 20 via the base station 12 and the communication line 11 and displays the content 100 based on the received content data. Moreover, the user terminal 30 transmits an advertising request for each display area 101 in the content 100 to the advertising server 40 via the base station 12 and the communication line 11.

The user terminal 30 then acquires advertisement data and the like for each display area 101, and plays back a video advertisement in the display area 101 based on the advertisement data.

Configuration of User Terminal 30

FIG. 4 is a block diagram illustrating an example of a functional configuration of the user terminal in the first embodiment. The user terminal 30 in the embodiment includes a data acquisition unit 300, a display control unit 301, a viewable area acquisition unit 302, a determination unit 303, a video control unit 304, a display device 310, an input device 311, and a speaker 312.

Among the functions included in the user terminal 30, the data acquisition unit 300, the display control unit 301, the viewable area acquisition unit 302, the determination unit 303, and the video control unit 304 are realized by the browser program executed by an arithmetic unit in the user terminal 30.

Especially, the viewable area acquisition unit 302, the determination unit 303, and the video control unit 304 are realized by the browser program executing the control program included in the content data distributed from the distribution device 20.

The data acquisition unit 300 transmits a URL of content data to the distribution device 20 via the communication line 11 and accordingly acquires the content data from the distribution device 20 via the communication line 11. The data acquisition unit 300 then analyzes the acquired content data and extracts an area ID of the display area 101 included in the content 100 created.

The data acquisition unit 300 then transmits an advertising request including the attribute information of the user of the user terminal 30 and the extracted area ID to the advertising server 40 via the communication line 11. An HTTP cookie (HyperText Transfer Protocol Cookie) saved in the user terminal 30 can be used for the attribute information of the user.

The data acquisition unit 300 receives advertisement data and information on reference positions for each area ID from the advertising server 40 via the communication line 11. The data acquisition unit 300 then transmits, to the display control unit 301, the information on the reference positions of each area ID together with the content data. Moreover, the data acquisition unit 300 transmits the area ID and the advertisement data to the video control unit 304.

The display control unit 301 constructs the content 100 based on the content data received from the data acquisition unit 300. The display control unit 301 then transmits, to the determination unit 303, the reference positions of the display area 101 where in the content 100 the video advertisement is played back, and the area ID associated with each area. The reference position of each display area 101 is represented, for example, by coordinates in the content 100.

Moreover, the display control unit 301 identifies a viewable area being an area that is being displayed on the screen of the user terminal 30 within the area in the content 100 in response to the user's operation accepted via the input device 311 such as a touch panel. The display control unit 301 then transmits image data of the content 100 included in the identified viewable area to the display device 310.

Moreover, the display control unit 301 makes a change of display such as the scrolling, enlargement, or reduction of the content 100 in response to the user's operation accepted via the input device 311 such as a touch panel. In that case, if display is being changed, the display control unit 301 notifies as such to the video control unit 304. If the change of display has ended, the display control unit 301 notifies that the change of display has ended to the video control unit 304. Moreover, in that case, if the display area 101 of the video advertisement enlarges in the viewable area, the display control unit 301 also notifies as such to the video control unit 304.

Moreover, if receiving frame data of the played video advertisement together with the area ID from the video control unit 304, the display control unit 301 maps an image of the received frame data on the display area 101 corresponding to the received area ID and transmits it to the display device 310. The display device 310 is, for example, a liquid crystal panel, and displays the image based on the data received from the display control unit 301.

The viewable area is described. FIG. 5 is a conceptual diagram illustrating an example of the viewable area. In the embodiment, for example, as illustrated in FIG. 5, a viewable area 106 is an area within the content 100's area, the area being included in a display area 105 of the browser and included in a display area 104 of the screen of the user terminal 30. For another example, the viewable area may be an area included in the display area 105 of the browser within the content 100's area.

The display control unit 301 acquires position information indicating the position and size of the viewable area from, for example, an OS (Operating System) executed on the user terminal. The display control unit 301 converts the position information of the viewable area into, for example, coordinates in the content 100 for management. In the example of FIG. 5, the hatched area is the viewable area 106.

If detecting the user's operation via the input device 311 such as a touch panel or a hardware switch, the viewable area acquisition unit 302 acquires the position information of the viewable area from the display control unit 301. The viewable area acquisition unit 302 then transmits the acquired position information of the viewable area to the determination unit 303.

The determination unit 303 uses the position information of the viewable area and the reference positions associated with the display area 101 of the video advertisement to determine whether or not the display area 101 is included in the viewable area with reference to, for example, the coordinates in the content 100. In the embodiment, the determination unit 303 determines that the display area 101 is included in the viewable area if all the reference positions associated with the display area 101 are included in the viewable area.

In the embodiment, the video advertisement is associated with a plurality of reference positions for the display area 101. FIGS. 6A, 6B, and 6C are conceptual diagrams illustrating examples of reference positions. Two reference positions are provided in the display area 101 in the embodiment, for example, as illustrated in FIG. 6A. The two reference positions 103a and 103b are different from each other in both the vertical coordinate value and the horizontal coordinate value in the display area 101.

In this manner, two reference positions having different vertical and horizontal coordinate values are provided in the display area 101. Accordingly, even if the content 100 is scrolled in any direction, the determination unit 303 determines that the display area 101 is included in the viewable area when the rectangular area with the two reference positions as opposite angles is included in the viewable area.

If the video advertisement is played back in the display area 101 at the stage where the rectangular area with the two reference positions as opposite angles has been included in the viewable area, the user terminal 30 can attract the user's attention to the video advertisement earlier than when the entire display area 101 has been included in the viewable area. Consequently, it is possible to increase the possibility that the user scrolls the content 100 so as to display the entire display area 101 in the viewable area. Consequently, it is possible to have more opportunities to have the user watch the video advertisement in the display area 101.

Moreover, if two reference positions are arranged in such a manner as to enclose an area that displays a characteristic image in the video advertisement by a rectangle with the two reference positions as opposite angles, the user terminal 30 can start playback of the video advertisement at the stage where the area that displays the characteristic image in the display area 101 has been included in the viewable area. Consequently, it is possible to have still more opportunities to attract the user's attention to the video advertisement. In many cases, an advertiser and creator of the video advertisement know the area that displays a characteristic image of a video advertisement. Hence, it is preferred that two reference positions, together with video advertisement data, be registered in the advertisement data storage unit 42 of the advertising server 40 by the advertiser or the like of the video advertisement data.

Moreover, showing the entire video may be easier to attract the user's attention depending on the content of a video advertisement. In such a case, for example, as illustrated in FIG. 6B, two opposite angles of the display area 101 are respectively set as the reference positions. Accordingly, it is also possible to start playback of the video when the entire display area 101 has been included in the viewable area. Also in this case, even if the content 100 is scrolled in any direction, the playback of the video advertisement can be started when the entire display area 101 has been included in the viewable area.

Moreover, for example, as illustrated in FIG. 6C, reference positions may be respectively provided on sides of the frame of the display area 101, the sides facing each other at the top and bottom, for the content 100 in which the scrolling direction is set as the vertical direction with respect to the display area 101. In this case, the playback of the video advertisement can be started when the entire display area 101 has been included in the viewable area during the scrolling in the vertical direction. Reference positions may be respectively provided on sides of the frame of the display area 101, the sides facing each other at the right and left, for the content 100 in which the scrolling direction is set as the horizontal direction.

The number of reference positions for one display area 101 may be three or more. Moreover, if the number of reference positions is three or more, the determination unit 303 may determine that the display area 101 is included in the viewable area when two or more reference positions are included in the viewable area in addition to when all the reference positions are included in the viewable area. Moreover, one reference position may be provided to one display area 101.

A description is continued returning to FIG. 4. If determining that the display area 101 is included in the viewable area using the position of the viewable area and the reference positions of the display area 101, the determination unit 303 transmits an area ID corresponding to the display area 101 to the video control unit 304. On the other hand, if determining that the display area 101 is not included in the viewable area, the determination unit 303 instructs the video control unit 304 to stop the playback of the video advertisement.

The video control unit 304 receives advertisement data of a video advertisement for each area ID from the display control unit 301 and holds the advertisement data. If receiving an area ID from the determination unit 303, the video control unit 304 starts the playback of advertisement data of a video advertisement held while being associated with the received area ID.

For example, the video control unit 304 decodes the advertisement data of the video advertisement, transmits the frame data together with the area ID to the display control unit 301, and accordingly starts the playback of the video advertisement. However, if receiving a notification to the effect that display is being changed from the display control unit 301, the video control unit 304 does not play back the video advertisement until receiving a notification to the effect that the change of display has ended. While the screen is changing, it is difficult for the user to understand the content of the video advertisement in many cases. Hence, the video control unit 304 does not play back the video advertisement while the screen is changing.

Moreover, if the video advertisement is a video with sound, the video control unit 304 also decodes the sound and outputs the decoded sound via the speaker 312. If the user has made a setting that disables sound output, the video control unit 304 does not output the sound of the video advertisement.

It may be configured such that if receiving, from the display control unit 301, a notification to the effect that the display area 101 of the video advertisement has enlarged in the viewable area 106, the video control unit 304 plays back the video advertisement in the display area 101, and outputs the sound of the video advertisement regardless of the user's setting of sound output. That the display area 101 of the video advertisement has enlarged in the viewable area 106 indicates a high possibility that the user is expressing interest in the video advertisement in the display area 101. Hence, in such a situation, the video control unit 304 may play back the video advertisement in the display area 101 and output the sound.

Figure 7:
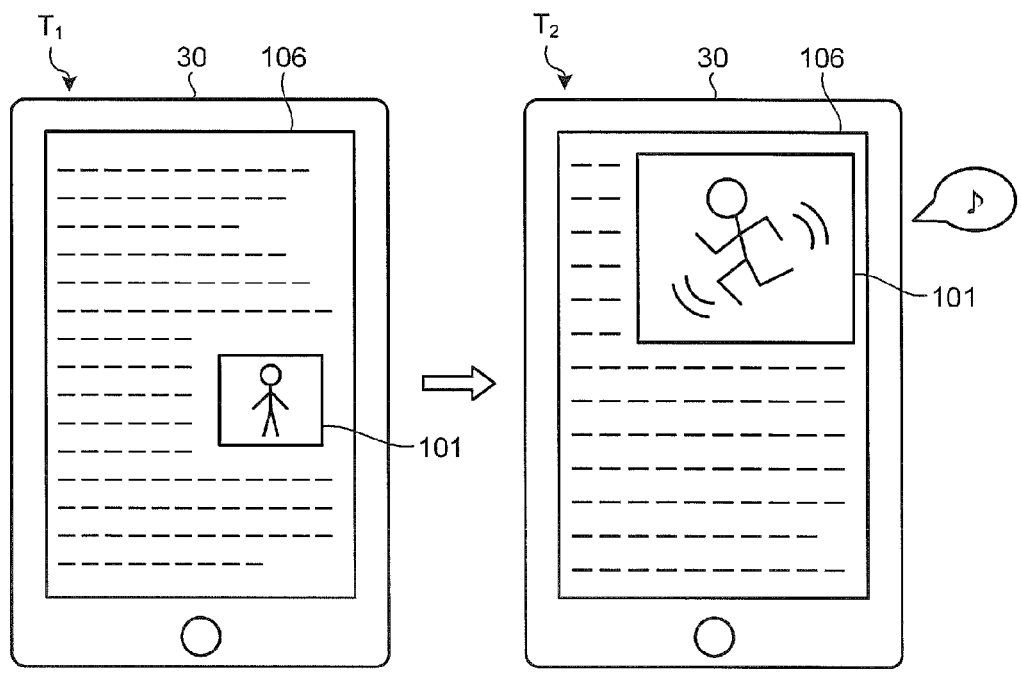
FIG. 7 is a conceptual diagram illustrating a method for displaying a video advertisement when a display area has been enlarged.

For example, as illustrated at time $T_1$ of FIG. 7, even if the display area 101 is included in the viewable area 106, when the video control unit 304 does not play back the video advertisement corresponding to the display area 101 and, for example, as illustrated at time $T_2$ of FIG. 7, the area of the display area 101 enlarges in the viewable area 106, the video control unit 304 plays back the video advertisement corresponding to the display area 101 and outputs the sound of the video advertisement.

Moreover, if being instructed by the determination unit 303 to stop the playback of the video advertisement, the video control unit 304 stops the decoding of the video advertisement to stop the playback of the video advertisement unless the playback of the video advertisement has ended. If the video advertisement is a video with sound, the video control unit 304 also stops the decoding of the sound.

Operations of User Terminal 30

Figure 8:
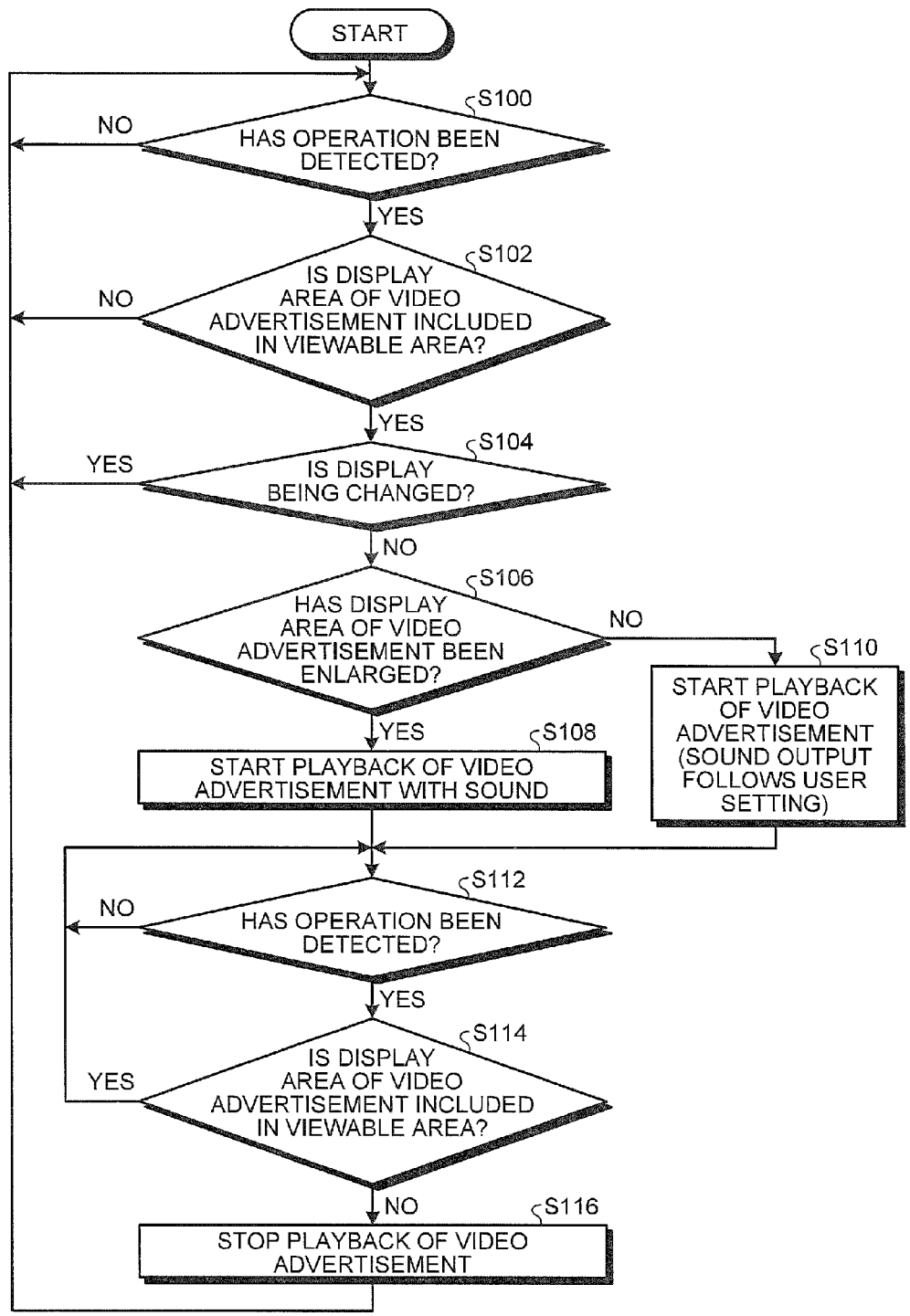
FIG. 8 is a flowchart illustrating an example of the operations of the user terminal in the first embodiment.

FIG. 8 is a flowchart illustrating an example of the operations of the user terminal in the first embodiment. The user terminal 30 acquires content data from the distribution device 20, reads the control program included in the acquired content data, and accordingly starts the operations illustrated in the flowchart.

Firstly, the viewable area acquisition unit 302 determines whether or not the user's operation has been detected via the input device 311 (step S100). If the user's operation has been detected (step S100: Yes), the viewable area acquisition unit 302 acquires the position information of the viewable area from the display control unit 301 to transmit the position information to the determination unit 303. The determination unit 303 uses the position information of the viewable area and reference positions associated with the display area 101 of a video advertisement to determine whether or not the display area 101 is included in the viewable area (step S102).

If the display area 101 is included in the viewable area (step S102: Yes), the determination unit 303 transmits, to the video control unit 304, an area ID corresponding to the display area 101 included in the viewable area. The video control unit 304 determines whether or not display is being changed (step S104). For example, if a notification received last from the display control unit 301 is a notification to the effect that display is being changed, the video control unit 304 determines that display is being changed. On the other hand, for example, if a notification received last from the display control unit 301 is a notification to the effect that the change of display has ended, the video control unit 304 determines that display is not being changed.

If the user's operation has not been detected (step S100: No), if the display area 101 is not included in the viewable area (step S102: No), or if display is being changed (step S104: Yes), the viewable area acquisition unit 302 reexecutes the process illustrated in step S100.

On the other hand, if display is not being changed (step S104: No), the video control unit 304 determines whether or not the display area 101 of the video advertisement has been enlarged in the viewable area 106 (step S106). If the display area 101 of the video advertisement has been enlarged in the viewable area 106 (step S106: Yes), the video control unit 304 plays back advertisement data of the video advertisement held while being associated with the area ID received from the determination unit 303 (step S108). At this point in time, if the video advertisement is a video with sound, the video control unit 304 also outputs the sound.

On the other hand, if the display area 101 of the video advertisement has not been enlarged in the viewable area 106 (step S106: No), the video control unit 304 plays back the advertisement data of the video advertisement held while being associated with the area ID received from the determination unit 303 (step S110). At this point in time, if the video advertisement is a video with sound, the video control unit 304 outputs the sound in accordance with the user setting.

If a part of the video advertisement had already been played back in previously executed step S108 or S110, the video control unit 304 may play back the video advertisement from where it is stopped, or play back the video advertisement from the beginning in current step S108 or S110.

Next, the viewable area acquisition unit 302 determines whether or not the user's operation has been detected via the input device 311 (step S112). If the user's operation has been detected (step S112: Yes), the viewable area acquisition unit 302 acquires the position information of the viewable area from the display control unit 301 and transmits the position information to the determination unit 303. The determination unit 303 uses the position information of the viewable area and reference positions associated with the display area 101 of the video advertisement to determine whether or not the display area 101 is included in the viewable area (step S114).

If the user's operation has not been detected (step S112: No), or if the display area 101 is included in the viewable area (step S114: Yes), the viewable area acquisition unit 302 reexecutes the process illustrated in step S112. While an operation is not detected and the display area 101 is being displayed on the screen, the video control unit 304 continues the playback of the video advertisement, which was started in step S108 or S110 and, if the entire video advertisement has been played back, ends the playback of the video advertisement.

On the other hand, if the display area 101 is not included in the viewable area (step S114: No), the determination unit 303 instructs the video control unit 304 to stop the playback of the video advertisement. If being playing back the video advertisement, the video control unit 304 stops the playback of the video advertisement (step S116). The viewable area acquisition unit 302 then reexecutes the process illustrated in step S100.

Up to this point the first embodiment has been described.

As is clear from the above description, the distribution system 10 of the embodiment plays back a video advertisement in a situation where it is highly likely that a user is looking at the screen and accordingly can reduce useless playback of the video advertisement. Consequently, the distribution system 10 of the embodiment can suppress an increase in the power consumption of the user terminal 30.

Second Embodiment

Next, a second embodiment is described with reference to the drawings. The configurations of the distribution system 10 and the distribution device 20 in the embodiment are similar to those of the first embodiment illustrated in FIG. 2. Accordingly, their detailed descriptions are omitted.

Configuration of User Terminal 30

Figure 9:
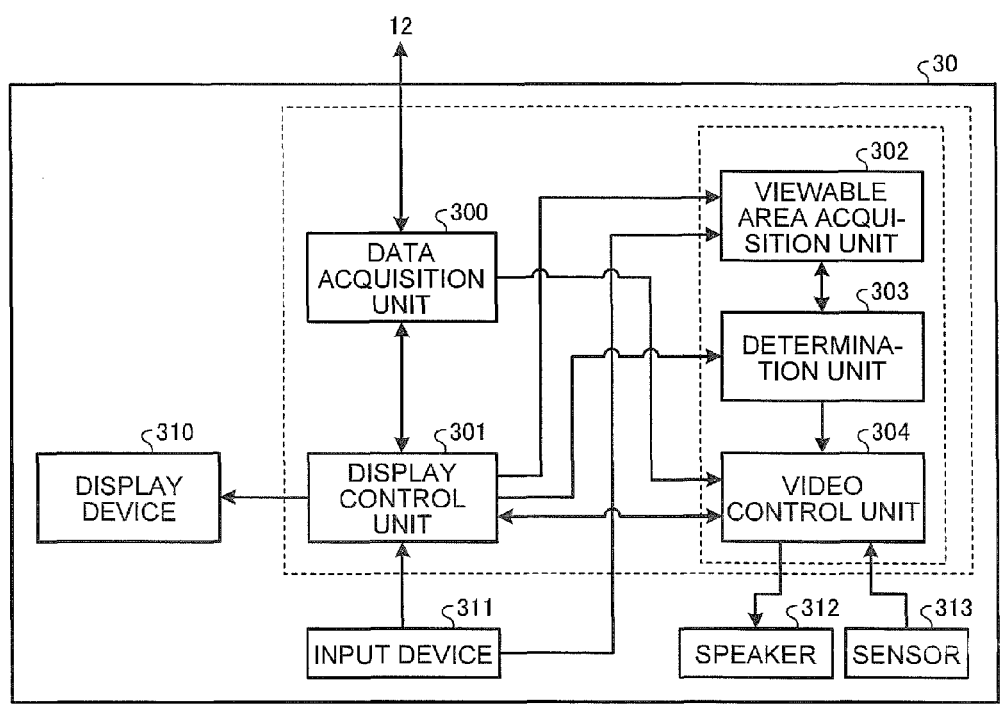
FIG. 9 is a block diagram illustrating an example of a functional configuration of a user terminal in a second embodiment.

FIG. 9 is a block diagram illustrating an example of a functional configuration of the user terminal in the second embodiment. The user terminal 30 in the embodiment includes a data acquisition unit 300, a display control unit 301, a viewable area acquisition unit 302, a determination unit 303, a video control unit 304, a display device 310, an input device 311, a speaker 312, and a sensor 313. In FIG. 9, the configurations to which the same reference numerals as those in FIG. 4 have the same or similar functions as or to the configurations in FIG. 4. Accordingly, their descriptions are omitted other than the points described below.

The sensor 313 is, for example, an accelerometer. The video control unit 304 calculates the moving speed of the user terminal 30 based on a signal output from the sensor 313. When the area ID of the display area 101 is received from the determination unit 303, if the moving speed of the user terminal 30 is equal to or more than a predetermined speed (for example, 30 km per hour), the playback of the video advertisement is started.

If the user is moving on a train or bus, it is conceivable that the user have lots of opportunities to look at the screen of the user terminal 30. Hence, the distribution device 20 of the embodiment distributes, to the user terminal 30, a control program to play back a video advertisement in the display area 101 of the video advertisement displayed in the viewable area 106 if the user terminal 30 is operated on the move at the predetermined speed or more. Consequently, the distribution device 20 can reduce useless playback of the video advertisement.

In the embodiment, if the moving speed of the user terminal 30 is equal to or more than the predetermined speed (for example, 30 km per hour), the video control unit 304 starts the playback of the video advertisement. However, it may be configured as another mode that if the moving speed of the user terminal 30 is less than a predetermined speed (for example, 4 km per hour), the video control unit 304 starts the playback of the video advertisement. When the user is walking or at rest, it is conceivable that there are also many users who have lots of opportunities to look at the screen of the user terminal 30. Hence, it may be configured such that if the user terminal 30 is operated while being moving or at rest at less than the predetermined speed, the distribution device 20 distributes, to the user terminal 30, the control program to play back the video advertisement in the display area 101 of the video advertisement displayed in the viewable area 106.

Operations of User Terminal 30

Figure 10:
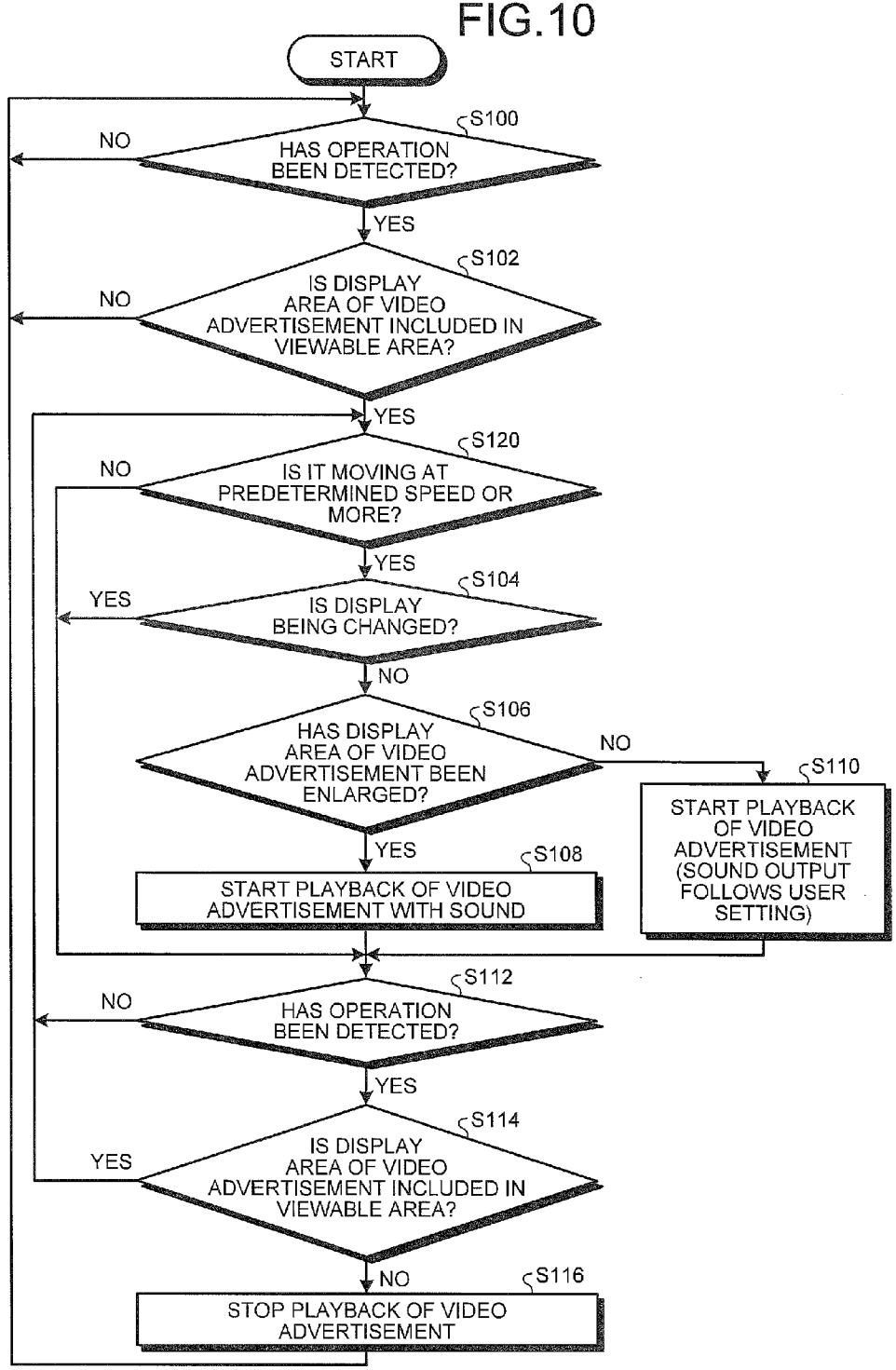
FIG. 10 is a flowchart illustrating an example of the operations of the user terminal in the second embodiment.

FIG. 10 is a flowchart illustrating an example of the operations of the user terminal in the second embodiment. The user terminal 30 acquires content data from the distribution device 20, reads the control program included in the acquired content data, and accordingly starts the operations illustrated in the flowchart. In FIG. 10, the processes to which the same reference numerals as those in FIG. 8 are assigned are the same or similar processes as or to those illustrated in FIG. 8. Accordingly, their descriptions are omitted other than the points described below.

If the display area 101 of the video advertisement is included in the viewable area (step S102: Yes), the determination unit 303 transmits, to the video control unit 304, an area ID corresponding to the display area 101 included in the viewable area. The video control unit 304 determines based on a signal output from the sensor 313 whether or not the user terminal 30 is moving at the predetermined speed or more (step S120).

If the user terminal 30 is moving at the predetermined speed or more (step S120: Yes), the video control unit 304 executes the process illustrated in step S104. On the other hand, if the user terminal 30 is not moving at the predetermined speed or more (step S120: No), or if display is being changed (step S104: Yes), the viewable area acquisition unit 302 executes the process illustrated in step S112.

If the playback of the video advertisement is started in step S108 or S110, and it is determined in step S120 that the user terminal 30 is not moving at the predetermined speed or more while the playback of the video advertisement is continuing, the video control unit 304 stops the playback of the video advertisement.

Moreover, if the user's operation has not been detected (step S112: No), or if the display area 101 is included in the viewable area (step S114: Yes), the video control unit 304 reexecutes the process illustrated in step S120.

Up to this point the second embodiment has been described.

As is clear from the above description, the distribution system 10 of the embodiment also can reduce useless playback of a video advertisement and suppress an increase in the power consumption of the user terminal 30.

Third Embodiment

Next, a third embodiment is described with reference to the drawings. The configurations of the distribution system 10 and the distribution device 20 in the embodiment are similar to those of the first embodiment illustrated in FIG. 2. Accordingly, their detailed descriptions are omitted other than the points described below.

Configuration of User Terminal 30

Figures 11, 12:
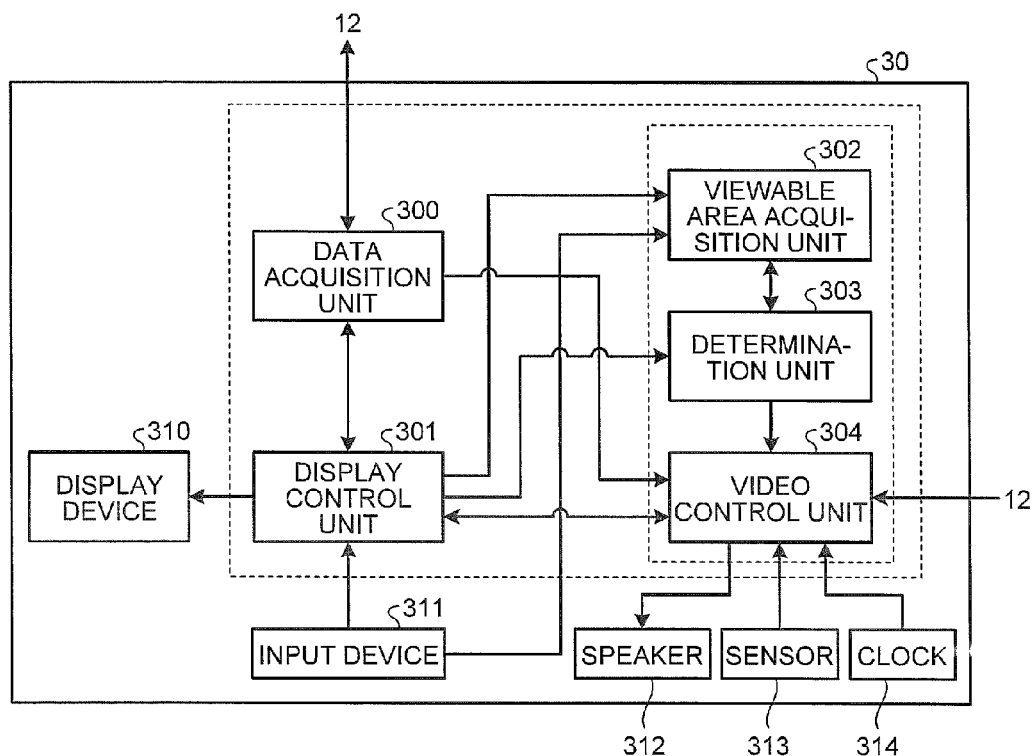
FIG. 11 is a block diagram illustrating an example of a functional configuration of a user terminal in a third embodiment.
FIG. 12 is a diagram illustrating an example of a data structure of a table held by a video control unit.

FIG. 11 is a block diagram illustrating an example of a functional configuration of the user terminal in the third embodiment. The user terminal 30 in the embodiment includes a data acquisition unit 300, a display control unit 301, a viewable area acquisition unit 302, a determination unit 303, a video control unit 304, a display device 310, an input device 311, a speaker 312, a sensor 313, and a clock 314. In FIG. 11, the configurations to which the same reference numerals as those in FIG. 4 are assigned have the same or similar functions as or to the configurations in FIG. 4. Accordingly, their descriptions are omitted other than the points described below.

The sensor 313 is, for example, a GPS receiver, and outputs a signal indicating the current location of the user terminal 30. The clock 314 outputs information indicating the current date and time. In the embodiment, map information that is divided into a plurality of areas, to each of which is assigned an area ID, is stored in the distribution device 20. The video control unit 304 acquires the map information from the distribution device 20 via the base station 12 and the communication line 11.

Moreover, for example, as illustrated in FIG. 12, the video control unit 304 holds a table 3040 in which time period information is associated with each area on the map. Information in the table 3040 is set, for example, by a user of the user terminal 30. For example, the user operates the user terminal 30 to register, in the table 3040, an area ID of an area including a location with a high possibility to look at the screen of the user terminal 30, and its time period.

If receiving the area ID of the display area 101 from the determination unit 303, the video control unit 304 identifies an area ID of an area including the current location of the user terminal 30 based on a signal from the sensor 313 and the map information acquired from the distribution device 20. The video control unit 304 then identifies information on a time period associated with the identified area ID, in the table 3040.

The video control unit 304 then determines whether or not the current date and time output from the clock 314 is included in the time period identified in the table 3040. If the current date and time output from the clock 314 is included in the time period identified in the table 3040, the video control unit 304 starts the playback of a video advertisement held while being associated with the area ID received from the determination unit 303.

It is conceivable that the user has lots of opportunities to look at the screen of the user terminal 30 at home and the like in the evenings of weekdays and on holidays. Hence, the distribution device 20 of the embodiment distributes, to the user terminal 30, a control program to play back a video advertisement in the display area 101 of the video advertisement displayed in the viewable area 106 if the user terminal 30 is in a specific location during a specific time period. Consequently, the distribution device 20 can reduce useless playback of the video advertisement.

In the embodiment, both the area and the time period are held in the table 3040. However, as another mode, one of the area and the time period may be held in the table 3040. Consequently, it is possible to handle users who have lots of opportunities to look at the screen of the user terminal 30 anywhere as long as during specific time periods, and users who have lots of opportunities to look at the screen of the user terminal 30 anytime as long as in specific locations.

Operations of User Terminal 30

Figure 13:
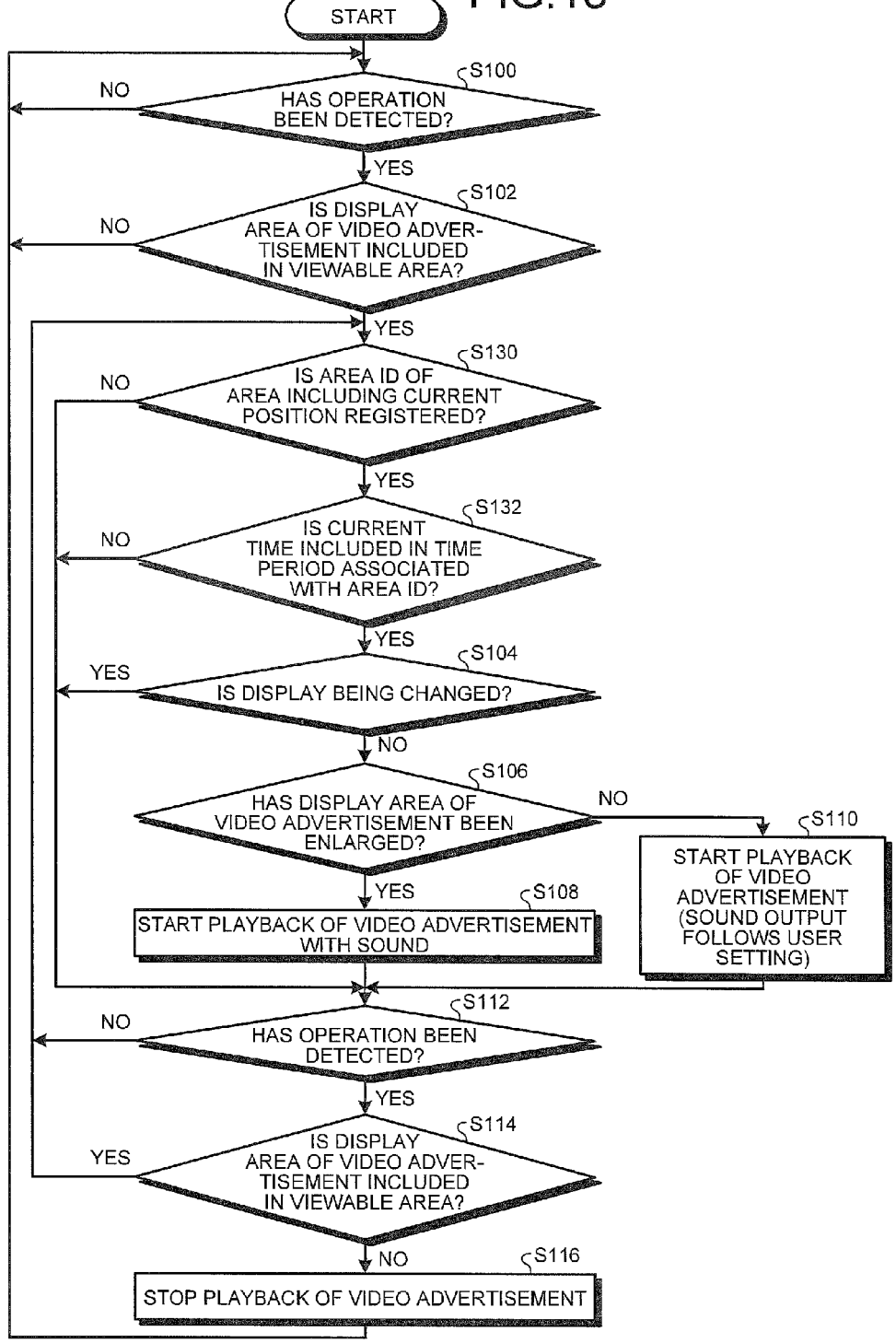
FIG. 13 is a flowchart illustrating an example of the operations of the user terminal in the third embodiment.

FIG. 13 is a flowchart illustrating an example of the operations of the user terminal in the third embodiment. The user terminal 30 acquires content data from the distribution device 20, reads the control program included in the acquired content data, and accordingly starts the operations illustrated in the flowchart. In FIG. 13, the processes to which the same reference numerals as those in FIG. 8 are assigned are the same or similar processes as or to those illustrated in FIG. 8. Accordingly, their descriptions are omitted other than the points described below.

If the display area 101 of the video advertisement is included in the viewable area (step S102: Yes), the determination unit 303 transmits, to the video control unit 304, an area ID corresponding to the display area 101 included in the viewable area. The video control unit 304 identifies an area ID of an area including the current location of the user terminal 30 based on a signal from the sensor 313 and the map information acquired from the distribution device 20. The video control unit 304 then determines whether or not the identified area ID is registered in the table 3040 (step S130).

If the area ID is registered in the table 3040 (step S130: Yes), the video control unit 304 identifies information on a time period associated with the area ID in the table 3040. The video control unit 304 then determines whether or not the current date and time output from the clock 314 is included in the time period identified in the table 3040 (step S132).

If the current date and time output from the clock 314 is included in the time period identified in the table 3040 (step S132: Yes), the video control unit 304 executes the process illustrated in step S104. On the other hand, if the area ID is not registered in the table 3040 (step S130: No), if the current date and time output from the clock 314 is not included in the time period identified in the table 3040 (step S132: No), or if display is being changed (step S104: Yes), the viewable area acquisition unit 302 executes the process illustrated in step S112.

If the playback of the video advertisement is started in step S108 or S110 and it is determined in step S130 that the area ID is not registered in the table 3040, or it is determined in step S132 that the current date and time output from the clock 314 is not included in the time period identified in the table 3040 while the playback of the video advertisement is continuing, the video control unit 304 stops the playback of the video advertisement.

Moreover, if the user's operation has not been detected (step S112: No), or if the display area 101 is included in the viewable area (step S114: Yes), the video control unit 304 reexecutes the process illustrated in step S130.

Up to this point the third embodiment has been described.

As is clear from the above description, the distribution system 10 of the embodiment also can reduce useless playback of a video advertisement and suppress an increase in the power consumption of the user terminal 30.

Fourth Embodiment

Next, a fourth embodiment is described with reference to the drawings.

Outline of Processes

Figure 14:
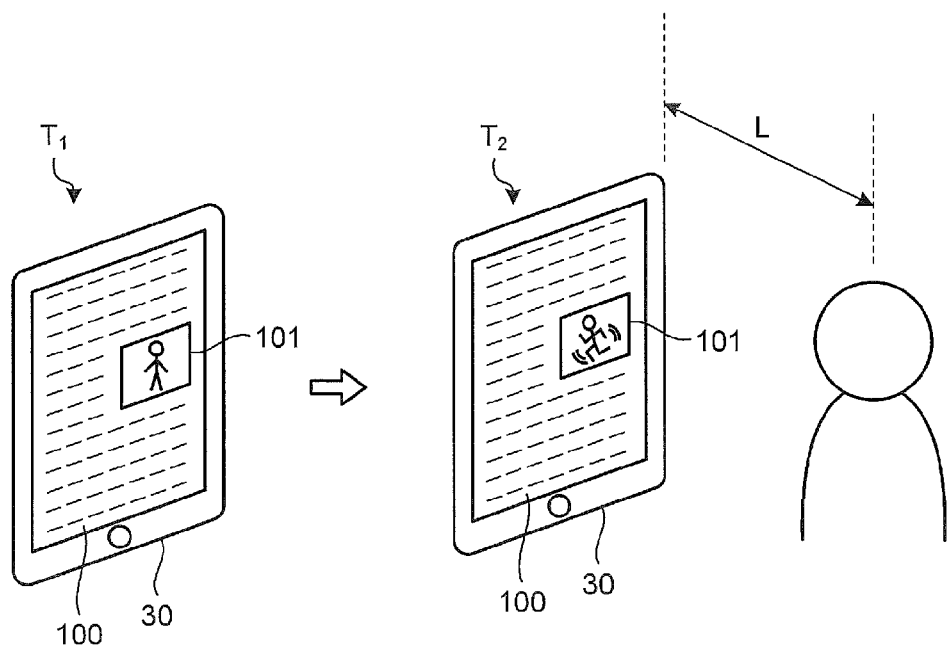
FIG. 14 is a conceptual diagram illustrating an example of an outline of processes in a fourth embodiment.

FIG. 14 is a conceptual diagram illustrating an example of an outline of processes in the fourth embodiment. In the embodiment, for example, as illustrated at time $T_1$ of FIG. 14, even if the display area 101 of a video advertisement is displayed in the viewable area, the user terminal 30 does not play back the video advertisement in the display area 101. On the other hand, in the embodiment, for example, as illustrated at time $T_2$ of FIG. 14, if there is an object (for example, the user's face) within a predetermined distance L (for example, several tens cm) from the screen of the user terminal 30 while the display area 101 of the video advertisement is being displayed in the viewable area, the user terminal 30 starts playback of the video advertisement in the display area 101.

The configurations of the distribution system 10 and the distribution device 20 in the embodiment are similar to those of the first embodiment illustrated in FIG. 2. Accordingly, their detailed descriptions are omitted. Moreover, the configuration of the user terminal 30 in the embodiment is similar to that of the second embodiment illustrated in FIG. 9. Accordingly, their detailed descriptions are omitted other than the points described below.

In the user terminal 30 of the embodiment, the sensor 313 is, for example, a distance sensor that measures the distance to an object in the vicinity of (for example, in front of) the screen of the user terminal 30 and outputs a signal indicating the measured distance. If receiving an area ID of the display area 101 from the determination unit 303, the video control unit 304 determines based on a signal output from the sensor 313 whether or not the distance to the object in front of the screen of the user terminal 30 is within the predetermined distance. If the distance to the object in front of the screen of the user terminal 30 is within the predetermined distance, the video control unit 304 starts the playback of the video advertisement held while being associated with the area ID received from the determination unit 303.

If there is an object within the predetermined distance from the screen of the user terminal 30, the object is highly likely to be the user's face. In such a case, it is highly likely that the user is looking at the screen of the user terminal 30. Hence, the distribution device 20 of the embodiment distributes, to the user terminal 30, a control program to play back a video advertisement in the display area 101 of the video advertisement displayed in the viewable area 106 if there is an object within the predetermined distance from the screen of the user terminal 30. Consequently, the distribution device 20 can reduce useless playback of the video advertisement.

It may be configured such that the user terminal 30 is provided with a camera, and the video control unit 304 determines whether or not the object in front of the screen of the user terminal 30 is a human face. In this case, the video control unit 304 plays back the video advertisement if there is a human face within the predetermined distance from the screen of the user terminal 30. Consequently, it is possible to further increase the possibility of reducing useless playback of the video advertisement.

Moreover, the video control unit 304 may analyze an image from the camera provided to the user terminal 30 and detect the line of sight of a person in front of the screen of the user terminal 30. In this case, if the line of sight of the person in front of the screen of the user terminal 30 is on the screen of the user terminal 30 (more preferably, on the display area 101), the video control unit 304 plays back the video advertisement. Consequently, it is possible to further increase the possibility of further reducing useless playback of the video advertisement.

Operations of User Terminal 30

Figure 15:
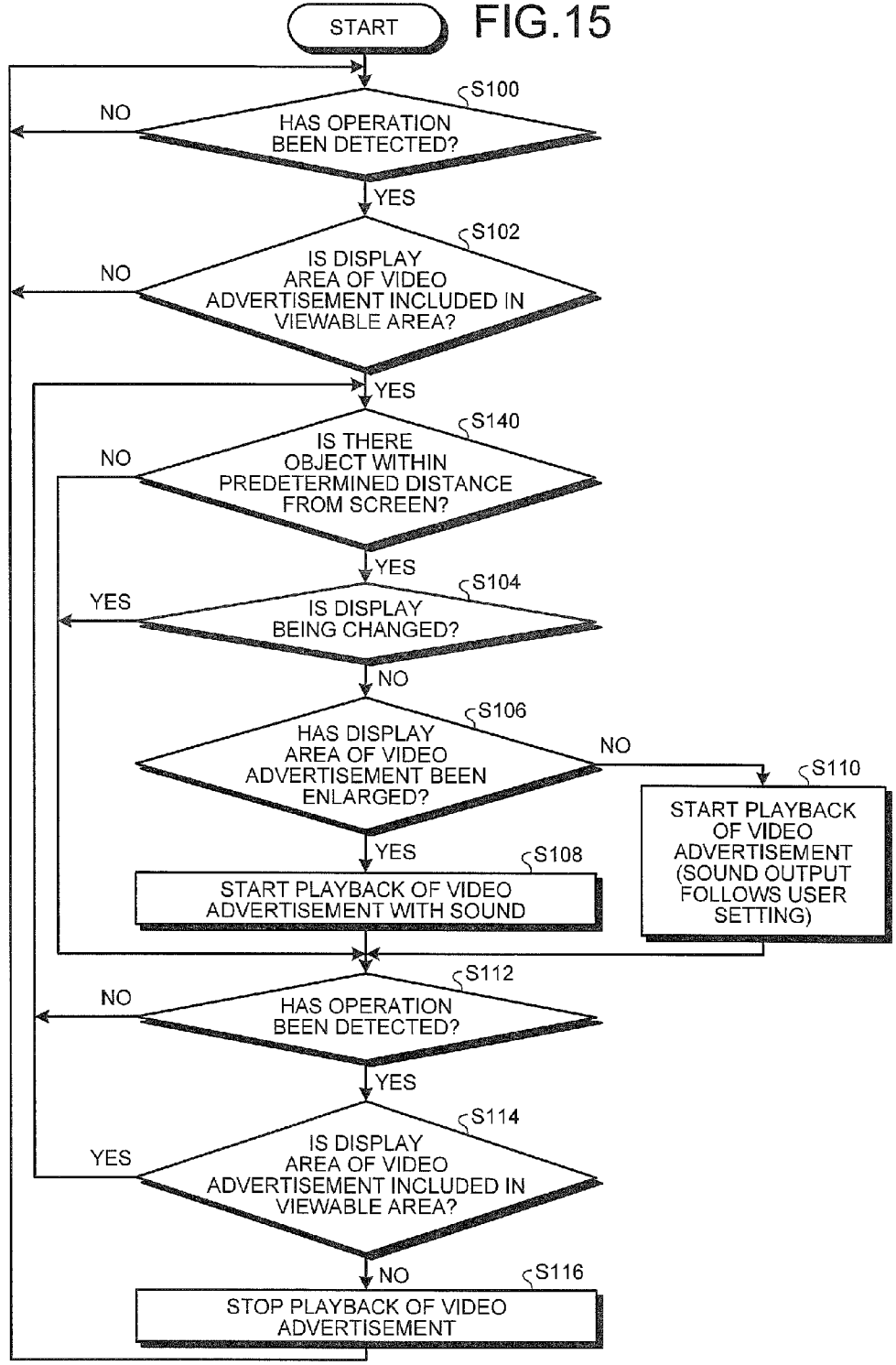
FIG. 15 is a flowchart illustrating an example of the operations of a user terminal in the fourth embodiment.

FIG. 15 is a flowchart illustrating an example of the operations of the user terminal in the fourth embodiment. The user terminal 30 acquires content data from the distribution device 20, reads the control program included in the acquired content data, and accordingly starts the operations illustrated in the flowchart. In FIG. 15, the processes to which the same reference numerals as those in FIG. 8 are assigned are the same or similar processes as or to those illustrated in FIG. 8. Accordingly, their descriptions are omitted other than the points described below.

If the display area 101 of the video advertisement is included in the viewable area (step S102: Yes), the determination unit 303 transmits, to the video control unit 304, an area ID corresponding to the display area 101 included in the viewable area. The video control unit 304 determines based on a signal output from the sensor 313 whether or not the distance to the object in front of the screen of the user terminal 30 is within the predetermined distance (step S140).

If the distance to the object in front of the screen of the user terminal 30 is within the predetermined distance (step S140: Yes), the video control unit 304 executes the process illustrated in step S104. On the other hand, if the distance to the object in front of the screen of the user terminal 30 is greater than the predetermined distance (step S140: No), or if display is being changed (step S104: Yes), the viewable area acquisition unit 302 executes the process illustrated in step S112.

If the playback of the video advertisement is started in step S108 or S110, and it is determined in step S140 that the distance to the object in front of the screen of the user terminal 30 is greater than the predetermined distance while the playback of the video advertisement is continuing, the video control unit 304 stops the playback of the video advertisement.

Moreover, if the user's operation has not been detected (step S112: No), or if the display area 101 is included in the viewable area (step S114: Yes), the video control unit 304 reexecutes the process illustrated in step S140.

Up to this point the fourth embodiment has been described.

As is clear from the above description, the distribution system 10 of the embodiment also can reduce useless playback of a video advertisement and suppress an increase in the power consumption of the user terminal 30.

Fifth Embodiment

Next, a fifth embodiment is described with reference to the drawings.

Outline of Processes

Figure 16:
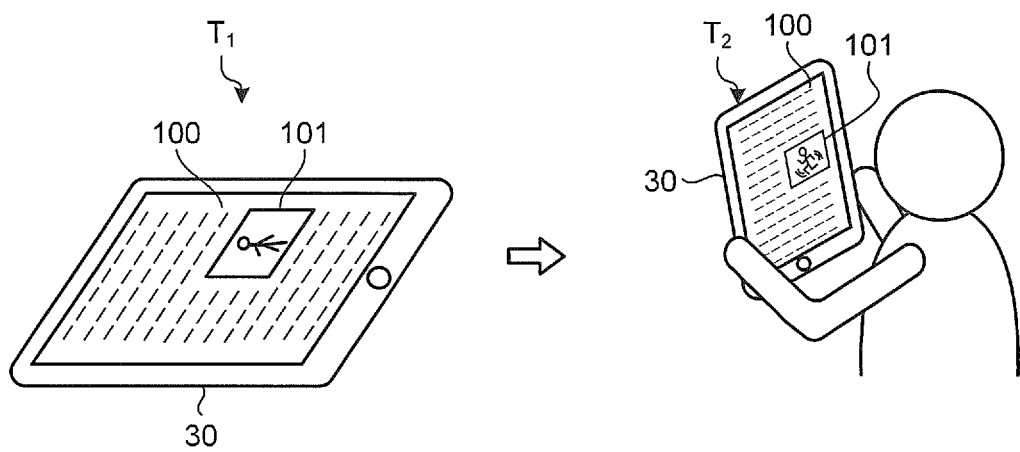
FIG. 16 is a conceptual diagram illustrating an example of an outline of processes in a fifth embodiment.

FIG. 16 is a conceptual diagram illustrating an example of an outline of processes in the fifth embodiment. In the embodiment, for example, as illustrated at time $T_1$ of FIG. 16, even if the display area 101 of a video advertisement is displayed in the viewable area, when the user is not holding the user terminal 30 by hand, the user terminal 30 does not play back the video advertisement in the display area 101.

On the other hand, in the embodiment, for example, as illustrated at time $T_2$ of FIG. 16, when the user is holding the user terminal 30 by hand while the display area 101 of the video advertisement is being displayed in the viewable area, the user terminal 30 starts playback of the video advertisement in the display area 101.

The configurations of the distribution system 10 and the distribution device 20 in the embodiment are similar to those of the first embodiment illustrated in FIG. 2. Accordingly, their detailed descriptions are omitted. Moreover, the configuration of the user terminal 30 in the embodiment is similar to that of the second embodiment illustrated in FIG. 9. Accordingly, their detailed descriptions are omitted other than the points described below.

In the user terminal 30 of the embodiment, the sensor 313, for example, measures the attitude and acceleration of the user terminal 30, and outputs a signal indicating the measured attitude and acceleration. If receiving an area ID of the display area 101 from the determination unit 303, the video control unit 304 determines based on a signal output from the sensor 313 whether or not the user terminal 30 is in a predetermined attitude. The predetermined attitude is an attitude that a surface of the screen of the user terminal 30 is inclined within a range of, for example, 10° to 80° with respect to the vertical plane.

If the user terminal 30 is in the predetermined attitude, the video control unit 304 determines based on the signal output from the sensor 313 whether or not acceleration is being detected. When the user is holding the user terminal 30 by hand, low acceleration is detected bit by bit due to the influences of the movements of the user's hand or user's operations. If acceleration is being detected, the video control unit 304 starts playback of the video advertisement held while being associated with the area ID received from the determination unit 303.

If the user terminal 30 is in the predetermined attitude and acceleration is being detected, it is highly likely that the user is holding the user terminal 30 by hand. In such a case, it is highly likely that the user is looking at the screen of the user terminal 30. Hence, the distribution device 20 of the embodiment distributes, to the user terminal 30, a control program to play back a video advertisement in the display area 101 of the video advertisement displayed in the viewable area 106 if the user terminal 30 is in the predetermined attitude and acceleration is being detected. Consequently, the distribution device 20 can reduce useless playback of a video advertisement.

Operations of User Terminal 30

Figure 17:
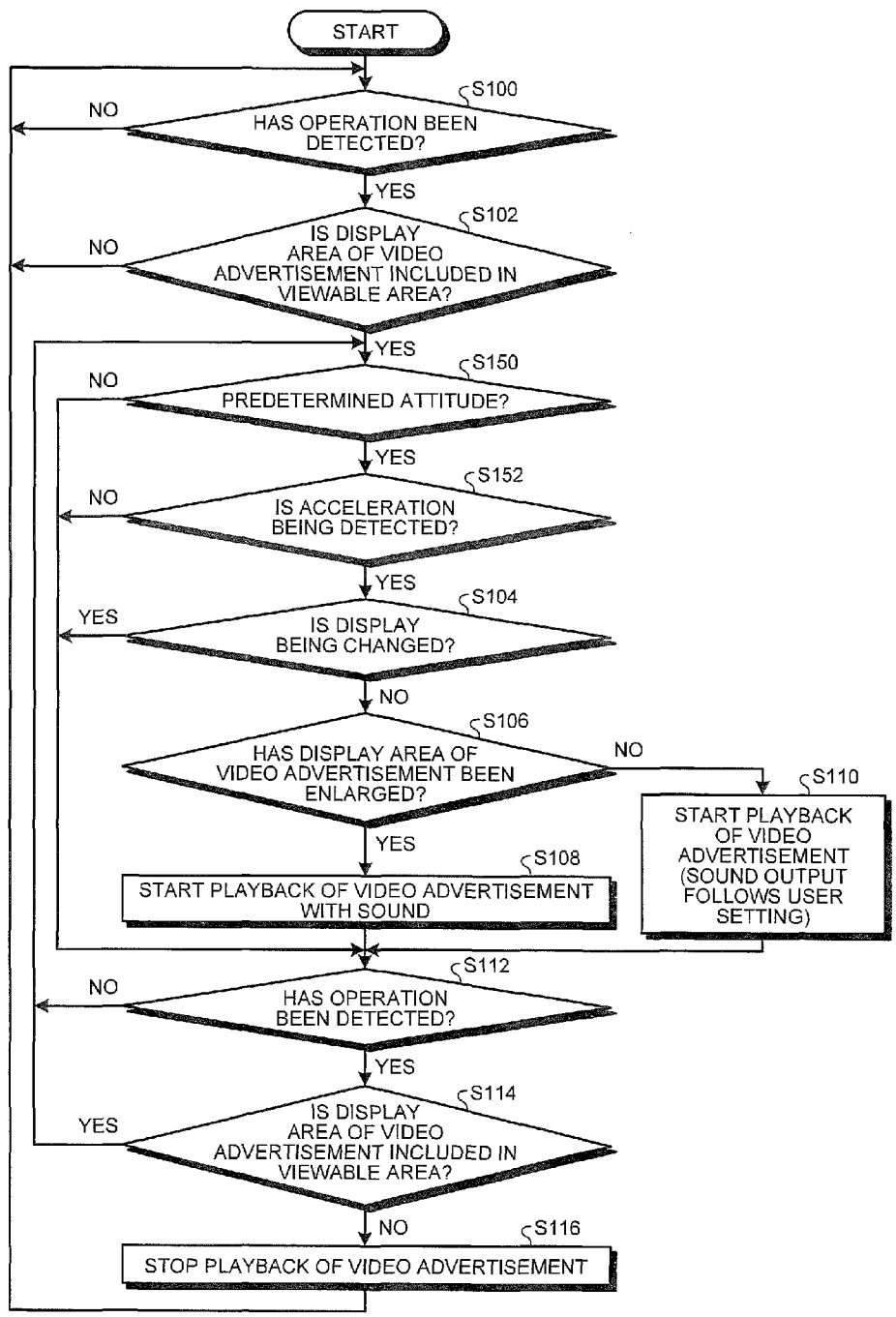
FIG. 17 is a flowchart illustrating an example of the operations of a user terminal in the fifth embodiment.

FIG. 17 is a flowchart illustrating an example of the operations of the user terminal in the fifth embodiment. The user terminal 30 acquires content data from the distribution device 20, reads the control program included in the acquired content data, and accordingly starts the operations illustrated in the flowchart. In FIG. 17, the processes to which the same reference numerals as those in FIG. 8 are assigned are the same or similar processes as or to those illustrated in FIG. 8. Accordingly, their descriptions are omitted other than the points described below.

If the display area 101 of the video advertisement is included in the viewable area (step S102: Yes), the determination unit 303 transmits, to the video control unit 304, an area ID corresponding to the display area 101 included in the viewable area. The video control unit 304 determines based on the signal output from the sensor 313 whether or not the user terminal 30 is in the predetermined attitude (step S150).

If the user terminal 30 is in the predetermined attitude (step S150: Yes), the video control unit 304 determines based on the signal output from the sensor 313 whether or not acceleration is being detected (step S152). If acceleration is being detected (step S152: Yes), the video control unit 304 executes the process illustrated in step S104.

On the other hand, if the user terminal 30 is not in the predetermined attitude (step S150: No), if acceleration is not being detected (step S152: No), or if display is being changed (step S104: Yes), the viewable area acquisition unit 302 executes the process illustrated in step S112.

If the playback of the video advertisement is started in step S108 or S110 and it is determined in step S150 that the user terminal 30 is not in the predetermined attitude, or it is determined in step S152 that acceleration is not being detected while the playback of the video advertisement is continuing, the video control unit 304 stops the playback of the video advertisement.

Moreover, if the user's operation has not been detected (step S112: No), or if the display area 101 is included in the viewable area (step S114: Yes), the video control unit 304 reexecutes the process illustrated in step S150.

Up to this point the fifth embodiment has been described.

As is clear from the above description, the distribution system 10 of the embodiment also can reduce useless playback of a video advertisement and suppress an increase in the power consumption of the user terminal 30.

Sixth Embodiment

Next, a sixth embodiment is described with reference to the drawings.

Outline of Processes

Figure 18:
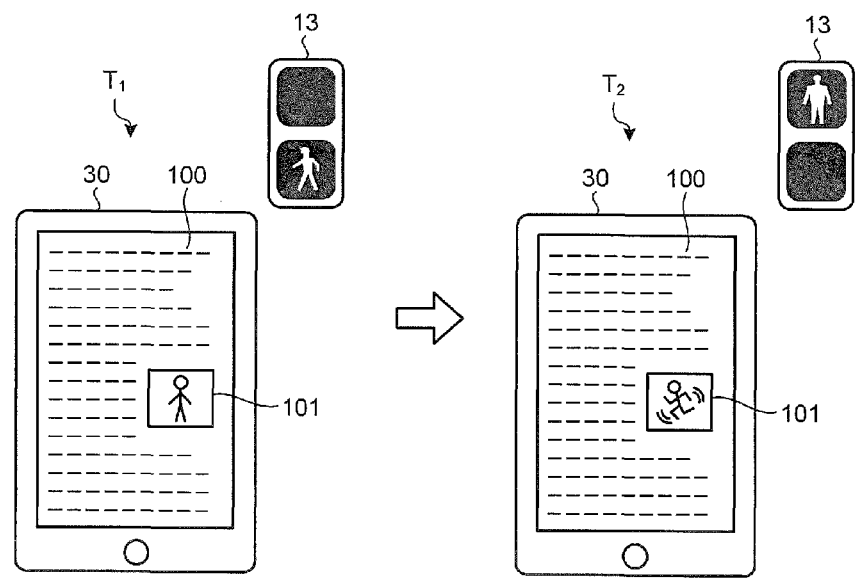
FIG. 18 is a conceptual diagram illustrating an example of an outline of processes in a sixth embodiment.

FIG. 18 is a conceptual diagram illustrating an example of an outline of processes in the sixth embodiment. In the embodiment, for example, as illustrated at time $T_1$ of FIG. 18, even if the display area 101 of the video advertisement is displayed in the viewable area, when a pedestrian traffic signal 13 in front of the user is displaying the green light, the user terminal 30 does not play back the video advertisement in the display area 101.

On the other hand, in the embodiment, for example, as illustrated at time $T_2$ of FIG. 18, when the pedestrian traffic signal 13 in front of the user is displaying the red light while the display area 101 of the video advertisement is being displayed in the viewable area, the user terminal 30 starts playback of the video advertisement in the display area 101.

Configurations of Distribution System 10 and Distribution Device 20

Figure 19:
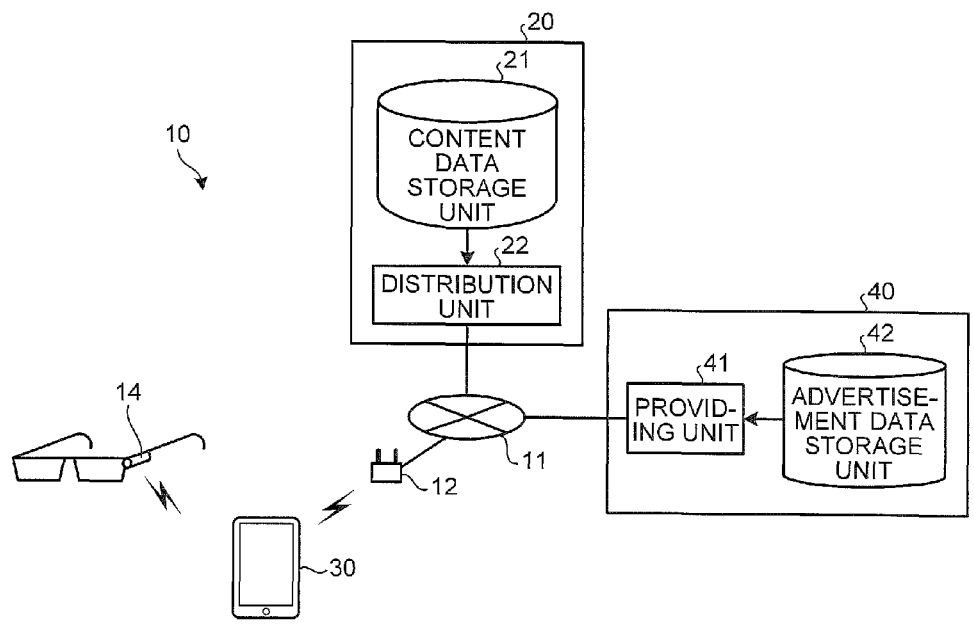
FIG. 19 is a system configuration diagram illustrating an example of a distribution system in the sixth embodiment.

FIG. 19 is a system configuration diagram illustrating an example of the distribution system in the sixth embodiment. The distribution system 10 in the embodiment includes a distribution device 20, a user terminal 30, an advertising server 40, and a camera 14. In FIG. 19, the configurations to which the same reference numerals as those in FIG. 2 are assigned have the same or similar functions as or to the configurations in FIG. 2. Accordingly, their descriptions are omitted other than the points described below.

The camera 14 is provided to the user's glasses, sunglasses, or the like to capture an image in front of the user. The data of the captured image is transmitted to the user terminal 30 in a near field communication mode such as a wireless LAN, Bluetooth (registered trademark), or Zigbee (registered trademark). A communication unit that communicates with the camera 14 is provided in the user terminal 30. The video control unit 304 in the user terminal 30 acquires the image data from the camera 14 via the communication unit.

The video control unit 304 then analyzes the image in front of the user based on the acquired data, and detects the pedestrian traffic signal 13 in front of the user by image recognition or the like. The video control unit 304 then determines the color of the light displayed on the pedestrian traffic signal 13. If the color of the light of the pedestrian traffic signal 13 is red, the video control unit 304 starts playback of a video advertisement. The video control unit 304 may determine the color of the light displayed on a pedestrian traffic signal by identifying an area with high brightness in an area of the traffic signal other than the color.

The red light of the pedestrian traffic signal in front of the user indicates a high possibility that the user is waiting for the signal change. In such a case, it is highly likely that the user is looking at the screen of the user terminal 30. Hence, the distribution device 20 of the embodiment distributes, to the user terminal 30, a control program to play back a video advertisement in the display area 101 of the video advertisement displayed in the viewable area 106 if the light of the pedestrian traffic signal in front is red. Consequently, the distribution device 20 can reduce useless playback of the video advertisement.

Operations of User Terminal 30

Figure 20:
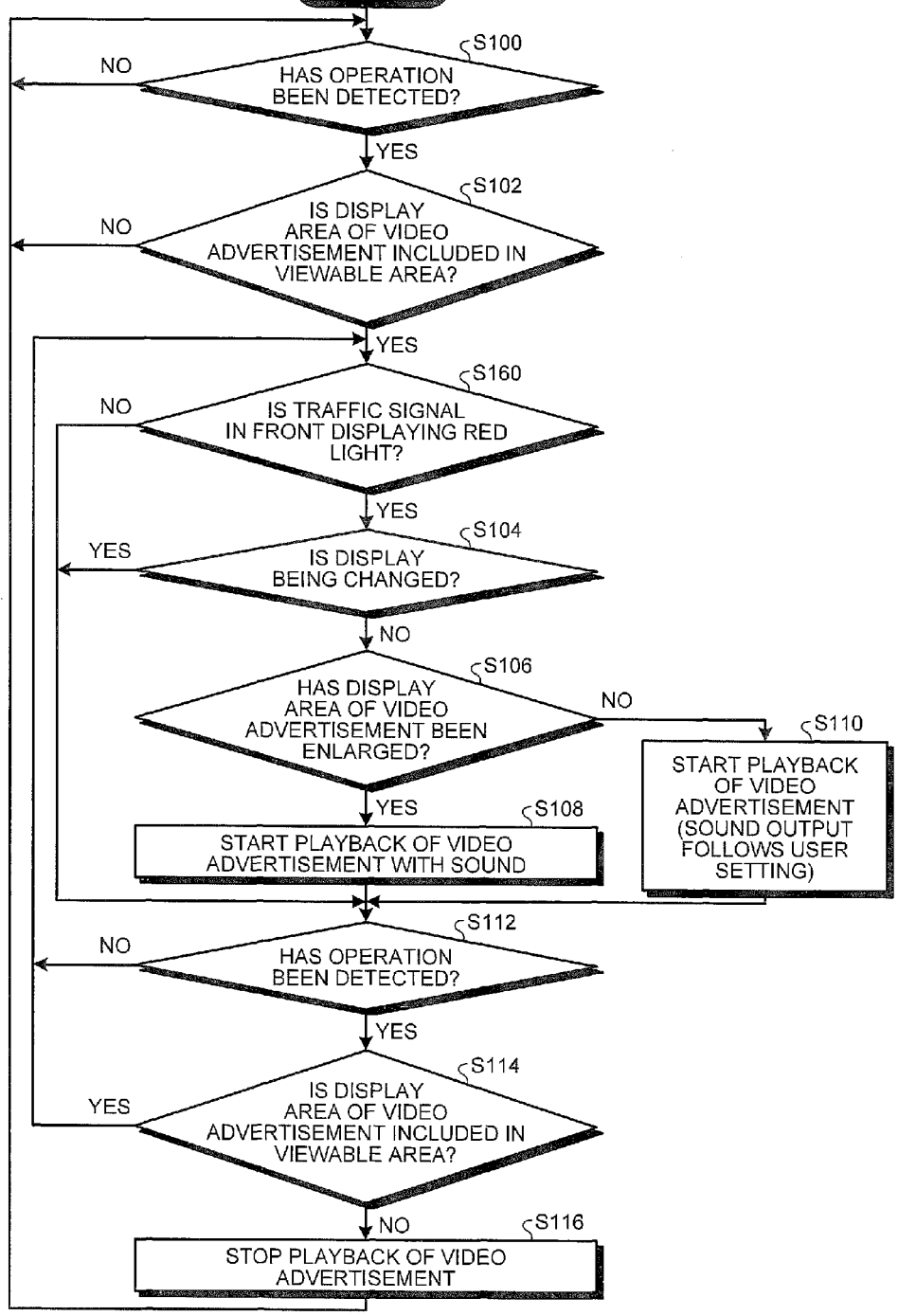
FIG. 20 is a flowchart illustrating an example of the operations of a user terminal in the sixth embodiment.

FIG. 20 is a flowchart illustrating an example of the operations of the user terminal in the sixth embodiment. The user terminal 30 acquires content data from the distribution device 20, reads the control program included in the acquired content data, and accordingly starts the operations illustrated in the flowchart. In FIG. 20, the processes to which the same reference numerals as those in FIG. 8 are assigned are the same or similar processes as or to those illustrated in FIG. 8. Accordingly, their descriptions are omitted other than the points described below.

If the display area 101 of the video advertisement is included in the viewable area (step S102: Yes), the determination unit 303 transmits, to the video control unit 304, an area ID corresponding to the display area 101 included in the viewable area. The video control unit 304 determines based on the data received from the camera 14 via the communication unit whether or not the traffic signal in front of the user is displaying the red light (step S160).

If the traffic signal in front is displaying the red light (step S160: Yes), the video control unit 304 executes the process illustrated in step S104. On the other hand, if the traffic signal in front is displaying the green light (step S160: No), or if display is being changed (step S104: Yes), the viewable area acquisition unit 302 executes the process illustrated in step S112.

If the playback of the video advertisement is started in step S108 or S110, and it is determined in step S160 that the traffic signal in front is displaying the green light while the playback of the video advertisement is continuing, the video control unit 304 stops the playback of the video advertisement.

Moreover, if the user's operation has not been detected (step S112: No), or if the display area 101 is included in the viewable area (step S114: Yes), the video control unit 304 reexecutes the process illustrated in step S160.

Up to this point the sixth embodiment has been described.

As is clear from the above description, the distribution system 10 of the embodiment also can reduce useless playback of a video advertisement and suppress an increase in the power consumption of the user terminal 30.

[Hardware Configuration of Distribution Device 20]

Figure 21:
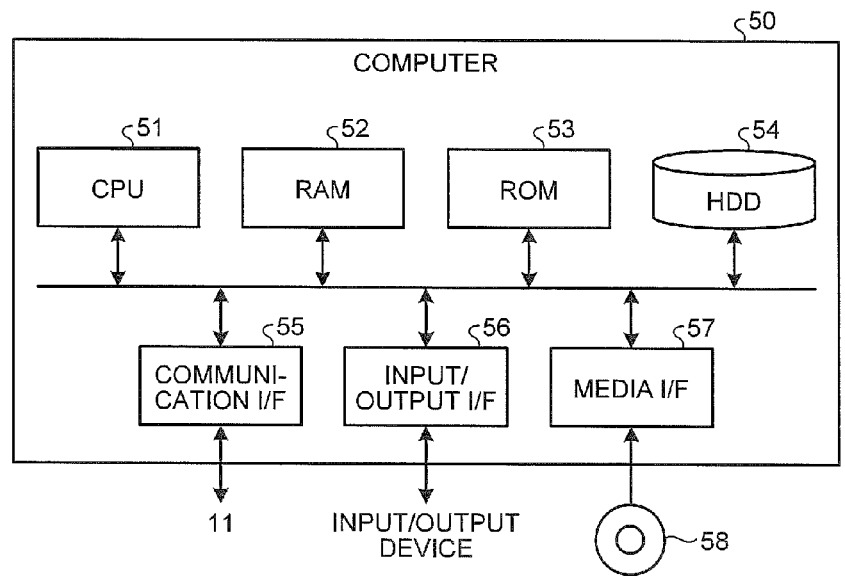
FIG. 21 is a hardware configuration diagram illustrating an example of a computer to realize the functions of a distribution device.

The distribution device 20 of the first to sixth embodiments is realized by, for example, a computer 50 with a configuration illustrated in FIG. 21. FIG. 21 is a hardware configuration diagram illustrating an example of a computer to realize the functions of a distribution device. The computer 50 includes a CPU (Central Processing Unit) 51, a RAM (Random Access Memory) 52, a ROM (Read Only Memory) 53, an HDD (Hard Disk Drive) 54, a communication interface (I/F) 55, an input/output interface (I/F) 56, and a media interface (I/F) 57.

The CPU 51 operates based on a program stored in the ROM 53 or the HDD 54, and controls the units. The ROM 53 stores a boot program to be executed by the CPU 51 at the startup of the computer 50, a program dependent on the hardware of the computer 50, and the like.

The HDD 54 stores the program executed by the CPU 51, and data used by the program, and the like. The communication interface 55 receives data from another component via the communication line 11, transmits the data to the CPU 51, and transmits data created by the CPU 51 to another component via the communication line 11.

The CPU 51 controls output devices such as a display and a printer, and input devices such as a keyboard and a mouse via the input/output interface 56. The CPU 51 acquires data from the input device via the input/output interface 56. Moreover, the CPU 51 outputs the created data to the output device via the input/output interface 56.

The media interface 57 reads a program or data stored in a recording medium 58, and provides the program or data to the CPU 51 via the RAM 52. The CPU 51 loads the program into the RAM 52 from the recording medium 58 via the media interface 57, and executes the loaded program. The recording medium 58 is, for example, an optical recording medium such as a DVD (Digital Versatile Disc) or a PD (Phase change rewritable Disk), a magneto-optical recording medium such as an MO (Magneto-Optical disk), a tape medium, a magnetic recording medium, or a semiconductor memory.

If the computer 50 functions as the distribution device 20 in the first to sixth embodiments, the CPU 51 of the computer 50 executes the program loaded into the RAM 52 to realize the functions of the content data storage unit 21 and the distribution unit 22. Moreover, the data in the content data storage unit 21 is stored in the HDD 54.

The CPU 51 of the computer 50 reads these programs from the recording medium 58 and executes the programs. However, as another example, the CPU 51 of the computer 50 may acquire these programs from another device via the communication line 11.

Moreover, in the distribution device 20 in the first to sixth embodiments, the control program included in each piece of content data stored in the content data storage unit 21 is read by the CPU in the user terminal 30. Accordingly, the user terminal 30 is caused to realize the functions of the viewable area acquisition unit 302, the determination unit 303, and the video control unit 304.

Moreover, in the above first embodiment, the distribution device 20 distributes, to the user terminal 30, the control program to play back a video advertisement in the display area 101 if the display area 101 of the video advertisement is included in the viewable area 106 and the user terminal 30 is operated. Moreover, for example, the distribution device 20 may distribute, to the user terminal 30, the control program to play back a video advertisement in the display area 101 if the display area 101 of the video advertisement is included in the viewable area 106, the user terminal 30 is operated, and a predetermined process is executed by the operation.

Figure 22:
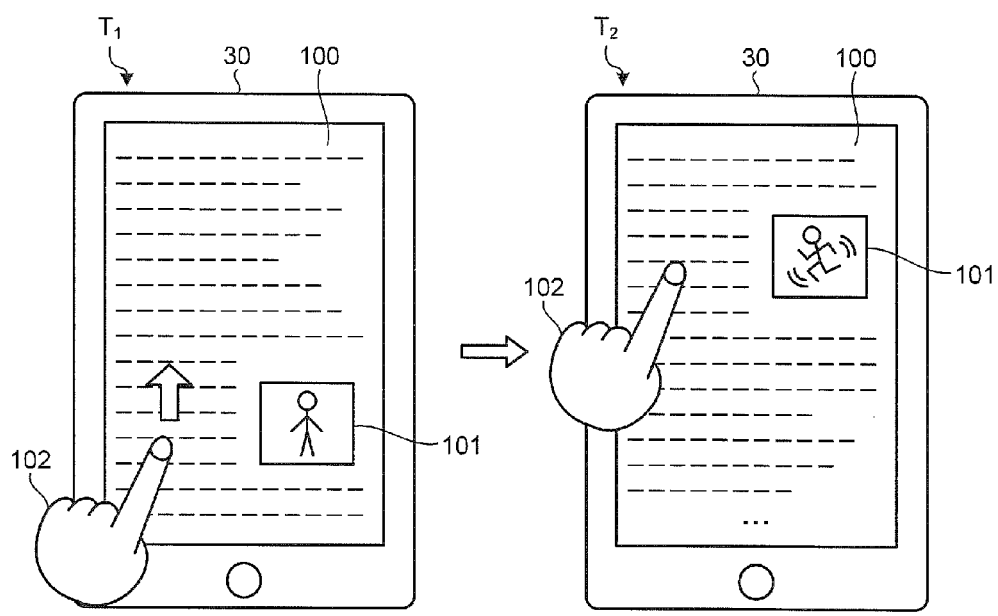
FIG. 22 is a conceptual diagram illustrating an example of an outline of processes in another embodiment.

FIG. 22 is a conceptual diagram illustrating an example of an outline of processes in another embodiment. For example, as in at time $T_1$ of FIG. 22, even if the display area 101 is included in the viewable area 106, and the user terminal 30 is operated, the user terminal 30 does not play back a video advertisement in the display area 101. It may be configured such that, for example, as in at time $T_2$ of FIG. 22, if the display area 101 is included in the viewable area 106 when the content 100 starts being reloaded from where it is stopped, the user terminal 30 plays back the video advertisement in the display area 101. The content 100, a part of which is displayed and the rest is reloaded in response to the user's operation, is, for example, a content displayed in a time line format.

That the user's operation allowed the content 100 to start being reloaded indicates a high possibility that the user 102 has viewed what is contained thus far in the content. Moreover, it may take some time to reload the content depending on the wireless communication environment. The user may be kept waiting until the content has been reloaded.

Hence, the distribution device 20 distributes, to the user terminal 30, the control program to play back a video advertisement in the display area 101 if the user terminal 30 is operated when the display area 101 of the video advertisement is included in the viewable area 106, and the operation allows the content to start being reloaded. Consequently, the distribution device 20 can cause the user terminal 30 to play back the video advertisement in the situation where it is highly likely that the user watches the video advertisement.

Moreover, the distribution device 20 may distribute, to the user terminal 30, the control program to play back a video advertisement in the display area 101 if the display area 101 of the video advertisement is included in the viewable area 106, and the process to enlarge the display area 101 of the video advertisement with respect to the viewable area 106 is executed by the user's operation. That the display area 101 of the video advertisement has enlarged in the viewable area 106 indicates a high possibility that the user is expressing interest in the video advertisement in the display area 101. Hence, the distribution device 20 may distribute the control program to control the user terminal 30 in such a manner as to play back the video advertisement in the display area 101 in such a situation.

Moreover, the above embodiments have been described taking the example where a video is a video advertisement. However, the video may be a movie, a documentary film, or the like.

Moreover, the above embodiments have been described taking the example where the distribution device 20 and the advertising server 40 are configured as separate devices. However, the function of the advertising server 40 may be provided in the distribution device 20.

Moreover, in the above embodiments, the determination unit 303 determines whether or not the display area of a video advertisement is included in the viewable area. However, the function of the determination unit 303 may be provided in the distribution device 20.

For example, the display control unit 301 transmits an area ID of the display area 101 of the video advertisement in the content 100 and information on reference positions of the display area 101 to the distribution device 20 via the communication line 11. Moreover, the viewable area acquisition unit 302 transmits the acquired position information of the viewable area to the distribution device 20 via the communication line 11.

The determination unit provided in the distribution device 20 then uses the position information of the viewable area and the reference positions associated with the display area 101 of the video advertisement to determine whether or not the display area 101 is included in the viewable area. If the display area 101 is determined to be included in the viewable area, the determination unit in the distribution device 20 transmits the area ID corresponding to the display area 101 included in the viewable area to the video control unit 304 via the communication line 11. On the other hand, if the display area 101 is determined to be not included in the viewable area, the determination unit in the distribution device 20 instructs the video control unit 304 via the communication line 11 to stop the playback of the video advertisement.

In this case, in addition to the content data storage unit 21 and the distribution unit 22, the determination unit is provided in the distribution device 20. However, the determination unit may be provided in a different device from the distribution device 20. In this case, the distribution device 20 may be managed by a media supplier such as a newspaper publishing company. The different device in which the determination unit is provided may be managed by an advertisement distributor or the like.

In the above embodiments, the video control unit 304 does not start playback of a video advertisement while the display control unit 301 is making a change of display such as the scrolling, enlargement, or reduction of the content 100 in response to the user's operation. However, for example, it may be configured such that the video control unit 304 does not start playback of a video advertisement if display is being changed by the display control unit 301 and the speed of the change of display is equal to or more than a predetermined value, and the video control unit 304 starts playback of the video advertisement if the speed of the change of display is less than the predetermined value.

For example, in the case of scrolling, the display control unit 301 calculates the change amount per unit time of the coordinate value of a predetermined position (for example, the top left of the frame indicating the viewable area) in the viewable area, as the scrolling speed, with reference to coordinates in the content 100. The display control unit 301 then notifies the video control unit 304 that display is being changed if the scrolling speed is equal to or more than predetermined, and notifies the video control unit 304 that the change of display has ended if the scrolling speed decreases below the predetermined. If receiving a notification to the effect that display is being changed, the video control unit 304 does not start playback of the video advertisement until receiving a notification to the effect that the change of display has ended.

Moreover, for example, in the case of enlargement orreduction, the display control unit 301 calculates the change amount per unit time of the vertical or horizontal length of the frame indicating the viewable area, as the enlargement or reduction speed, with reference to coordinates in the content 100. The display control unit 301 then notifies the video control unit 304 that display is being changed if the enlargement or reduction speed is equal to or more than a predetermined value, and notifies the video control unit 304 that the change of display has ended if the enlargement or reduction speed decreases below the predetermined value. If receiving a notification to the effect that display is being changed, the video control unit 304 does not start playback of the video advertisement until receiving a notification to the effect that the change of display has ended.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A distribution device comprising:
   a processor programmed to:
   distribute a content including a control program to a user terminal having a display, the control program causing the user terminal to execute:
   an acquisition procedure to acquire an area of the content, the area being displayed by a browser program, as a viewable area;
   a determination procedure to determine whether or not a display area displaying a video is located in the viewable area, the display area being included in the content; and
   a playback procedure to start playback of the video in response to: (i) the display area being located in the viewable area, and (ii) a situation of the user terminal being a predetermined situation, wherein:
   the playback procedure determines that the situation of the user terminal is the predetermined situation upon: the moving speed of the user terminal being equal to or more than a predetermined speed, the display of the user terminal is not being changed by the user, and the user has enlarged the display area in the viewable area, and
   the playback procedure determines that the user has enlarged the display area in the viewable area when an enlargement speed of the viewable area is equal or greater than a predetermined value, the enlargement speed being calculated based on a change amount per unit time of a vertical length or a horizontal length of a frame corresponding to the viewable area with reference to coordinates in the content.

2. The distribution device according to claim 1, wherein the acquisition procedure further acquires an area displayed on a screen of the user terminal as the viewable area within the area displayed by the browser program.

3. The distribution device according to claim 1, wherein the playback procedure determines that the situation of the user terminal is the predetermined situation upon the user terminal being operated.

4. The distribution device according to claim 3, wherein the playback procedure determines that the situation of the user terminal is the predetermined situation upon the moving speed of the user terminal being within a predetermined speed and the user terminal being operated.

5. The distribution device according to claim 3, wherein the playback procedure determines that the situation of the user terminal is the predetermined situation upon the user terminal being operated during a predetermined time period.

6. The distribution device according to claim 3, wherein the playback procedure determines that the situation of the user terminal is the predetermined situation upon the current location of the user terminal being in a predetermined area and the user terminal being operated.

7. The distribution device according to claim 3, wherein the playback procedure determines that the situation of the user terminal is the predetermined situation upon the user terminal being operated and the content starts being loaded from where it is stopped.

8. The distribution device according to claim 3, wherein the playback procedure determines that the situation of the user terminal is the predetermined situation upon the user terminal being operated and the display area being enlarged with respect to the viewable area.

9. The distribution device according to claim 1, wherein the playback procedure determines that the situation of the user terminal is the predetermined situation upon the distance between the screen of the user terminal and an object in the vicinity of the screen being less than a predetermined value.

10. The distribution device according to claim 1, wherein the playback procedure determines that the situation of the user terminal is the predetermined situation upon the user terminal being in a predetermined attitude and acceleration being detected.

11. The distribution device according to claim 1, wherein the playback procedure does not start playback of the video while the content is being scrolled at a predetermined speed or more even upon the display area being located in the viewable area and even in the predetermined situation.

12. The distribution device according to claim 1, wherein the playback procedure does not start the playback of the video while display is changing at a predetermined speed or more by the display area being enlarged or reduced with respect to the viewable area even upon the display area being located in the viewable area and it being determined to be in the predetermined situation.

13. The distribution device according to claim 1, wherein the playback procedure determines whether the user has enlarged the display area, and in response to the display area being enlarged by the user, the playback of the video automatically includes sound.

14. A distribution method in which a computer executes the step of distributing a content including a control program to a user terminal having a display, the control program causing the user terminal to execute:

an acquisition procedure to acquire an area of the content, the area being displayed by a browser program, as a viewable area;

a determination procedure to determine whether or not a display area displaying a video is located in the viewable area, the display area being included in the content; and a playback procedure to start playback of the video in response to: (i) the display area being located in the viewable area, and (ii) a situation of the user terminal being a predetermined situation, wherein:

the playback procedure determines that the situation of the user terminal is the predetermined situation upon: the moving speed of the user terminal being equal to or more than a predetermined speed, the display of the user terminal is not being changed by the user, and the user has enlarged the display area in the viewable area, and the playback procedure determines that the user has enlarged the display area in the viewable area when an enlargement speed of the viewable area is equal or greater than a predetermined value, the enlargement speed being calculated based on a change amount per unit time of a vertical length or a horizontal length of a frame corresponding to the viewable area with reference to coordinates in the content.

15. The distribution method according to claim 14, wherein the playback procedure determines whether the user has enlarged the display area, and in response to the display area being enlarged by the user, the playback of the video automatically includes sound.

16. A non-transitory computer-readable storage medium with an executable program stored thereon, the program causing a computer to execute a procedure for distributing a content including a control program to a user terminal having a display, the control program causing the user terminal to execute:

an acquisition procedure to acquire an area of the content, the area being displayed by a browser program, as a viewable area;

a determination procedure to determine whether or not a display area displaying a video is located in the viewable area, the display area being included in the content; and a playback procedure to start playback of the video in response to: (i) the display area being located in the viewable area, and (ii) a situation of the user terminal being a predetermined situation, wherein:

the playback procedure determines that the situation of the user terminal is the predetermined situation upon: the moving speed of the user terminal being equal to or more than a predetermined speed, the display of the user terminal is not being changed by the user, and the user has enlarged the display area in the viewable area, and the playback procedure determines that the user has enlarged the display area in the viewable area when an enlargement speed of the viewable area is equal or greater than a predetermined value, the enlargement speed being calculated based on a change amount per unit time of a vertical length or a horizontal length of a frame corresponding to the viewable area with reference to coordinates in the content.

17. The non-transitory computer-readable storage medium according to claim 16, wherein the playback procedure determines whether the user has enlarged the display area, and in response to the display area being enlarged by the user, the playback of the video automatically includes sound.

* * * * *